(12) United States Patent
Kuramoto et al.

(10) Patent No.: US 9,600,903 B2
(45) Date of Patent: Mar. 21, 2017

(54) MEDICAL IMAGE PROCESSING DEVICE AND METHOD FOR OPERATING THE SAME

(71) Applicant: FUJIFILM Corporation, Tokyo (JP)

(72) Inventors: Masayuki Kuramoto, Ashigarakami-gun (JP); Makoto Sugizaki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/856,839

(22) Filed: Sep. 17, 2015

(65) Prior Publication Data

US 2016/0093067 A1 Mar. 31, 2016

(30) Foreign Application Priority Data

Sep. 30, 2014 (JP) ................................ 2014-201756

(51) Int. Cl.
| | |
|---|---|
| G06K 9/00 | (2006.01) |
| G06T 7/40 | (2006.01) |
| G06K 9/46 | (2006.01) |
| G06K 9/62 | (2006.01) |
| G06K 9/52 | (2006.01) |
| G06T 5/00 | (2006.01) |

(52) U.S. Cl.
CPC ............ *G06T 7/408* (2013.01); *G06K 9/4604* (2013.01); *G06K 9/4652* (2013.01); *G06K 9/4661* (2013.01); *G06K 9/52* (2013.01); *G06K 9/6215* (2013.01); *G06T 5/001* (2013.01); *G06K 2009/4666* (2013.01); *G06T 2207/10024* (2013.01); *G06T 2207/10068* (2013.01); *G06T 2207/30004* (2013.01)

(58) Field of Classification Search
None
See application file for complete search history.

(56) References Cited

U.S. PATENT DOCUMENTS

| | | | | |
|---|---|---|---|---|
| 2005/0244072 A1* | 11/2005 | Imai | .................. | G06K 9/00664 |
| | | | | 382/254 |
| 2008/0143881 A1* | 6/2008 | Tsukioka | ................. | G06T 5/20 |
| | | | | 348/631 |
| 2014/0177955 A1* | 6/2014 | Srinivasan | ......... | G06K 9/00375 |
| | | | | 382/165 |

FOREIGN PATENT DOCUMENTS

JP 2003-220019 A 8/2003

* cited by examiner

*Primary Examiner* — Weiwen Yang
(74) *Attorney, Agent, or Firm* — Birch, Stewart, Kolasch & Birch, LLP

(57) ABSTRACT

RGB image signals are inputted. B/G ratio is calculated based on B image signal and G image signal. G/R ratio is calculated based on the G image signal and R image signal. In a feature space formed by the B/G ratio and the G/R ratio, a third process for increasing a difference in saturation between coordinates in a first observation area and coordinates in a second observation area is performed. In the first observation area, coordinates corresponding to a portion infected with *H. pylori* are distributed. In the second observation area, coordinates corresponding to a portion in which eradication of the *H. pylori* infection has been successful are distributed.

14 Claims, 35 Drawing Sheets

(A)        (B)

(A)        (B)

(A)   (B)

(A)   (B)

MEDICAL IMAGE PROCESSING DEVICE AND METHOD FOR OPERATING THE SAME

CROSS-REFERENCE TO RELATED APPLICATIONS

The present application claims priority under 35 U.S.C. §119 to Japanese Patent Application No. 2014-201756, filed Sep. 30, 2014. The above application is hereby expressly incorporated by reference, in its entirety, into the present application.

BACKGROUND OF THE INVENTION

1. Field of the Invention

The present invention relates to a medical image processing device for capturing and displaying a medical image of an observation target inside a subject under inspection, and a method for operating the medical image processing device.

2. Description Related to the Prior Art

Recently, in diagnosing stomach cancer, it has been recognized that the onset of the stomach cancer is closely related to the presence of *Helicobacter pylori* (*H. pylori*). In 1994, WHO (the World Health Organization) announced that the *H. pylori* is a carcinogen. The eradication of the H. Pylori infection has been performed to prevent the stomach cancer. After the eradication, whether the eradication has been successful is examined.

Whether a patient is infected or uninfected with the *H. pylori* is examined by a blood test or by using an endoscope system including a light source device, an endoscope, and a processor device. In the endoscope system, illumination light is applied from the endoscope to an observation target. Based on RGB image signals, which are obtained by capturing an image of the illuminated observation target with an image sensor of the endoscope, an image of the observation target is displayed on a monitor. In the case where diffuse redness appears in the image on the monitor, it is diagnosed that there is a high possibility of the presence of the *H. pylori* and it is likely to cause cancer. It is also known that the presence of the *H. pylori* correlates with IHb (also referred to as the hemoglobin index, which is represented by a G/R ratio between a G image signal and an R image signal) (see Japanese Patent Laid-Open Publication No. 2003-220019). In Japanese Patent Laid-Open Publication No. 2003-220019, the IHb is used as an index for determining whether the eradication of the *H. pylori* infection has been successful. According to Japanese Patent Laid-Open Publication No. 2003-220019, in the case where the IHb is greater than a threshold value "59", it is diagnosed that the eradication of the *H. pylori* infection has not been successful and the *H. pylori* is still present. In contrast, in the case where the IHb is less than the threshold value "59", it is diagnosed that the *H. pylori* infection has been eradicated successfully.

As illustrated in FIG. 44, in a feature space formed by the B/G ratio (the vertical axis, the ratio between the B image signal and the G image signal) and the G/R ratio (horizontal axis), the coordinates corresponding to a portion of the observation target uninfected with the *H. pylori* are distributed in an observation area "A". The coordinates corresponding to a portion of the observation target infected with the *H. pylori* are distributed in an observation area "B". The coordinates corresponding to a portion of the observation target in which the eradication of the *H. pylori* infection has been successful are distributed in an observation area "C". In this feature space, the observation areas "A" and "B" are completely apart from each other. In this case, the observation areas "A" and "B" are distinguished from each other based only on the value of the G/R ratio (the horizontal axis), that is, the value of the IHb. On the other hand, the observation area "B" and the observation area "C" are mixed in the feature space, so that it is difficult to distinguish the observation area "B" from the observation area "C" based only on the value of the G/R ratio (the horizontal axis). Therefore, it has been required to display images which allow distinction, using a method other than that using the IHb, between the portion infected with the *H. pylori* and the portion in which the eradication of the *H. pylori* infection has been successful.

SUMMARY OF THE INVENTION

An object of the present invention is to provide a medical image processing device for producing an image which allows distinction between *H. pylori* infection and successful eradication of the *H. pylori* infection and a method for operating the medical image processing device.

A medical image processing device according to the present invention includes an input processing unit, a color information obtaining section, and a saturation enhancement processing unit. The input processing unit performs an input process of a first color image signal. The color information obtaining section obtains two or more pieces of color information from the first color image signal. The saturation enhancement processing unit performs a saturation enhancement process EPx for increasing a difference in saturation between coordinates in a first observation area and coordinates in a second observation area in a feature space formed by the two or more pieces of color information. The first observation area is located on one side of a first boundary, and the second observation area is located on the other side of the first boundary.

The saturation enhancement process EPx preferably changes radial coordinates represented by coordinates in the first observation area and radial coordinates represented by coordinates in the second observation area such that the radial coordinates in the first observation area and the radial coordinates in the second observation areas are moved away from the first boundary. It is preferred that a radial coordinate changing region including the coordinates in the first observation area and the coordinates in the second observation area is composed of a radial coordinate changing region Rx extending from the first boundary to a specific extent and a radial coordinate changing region Ry beyond the radial coordinate changing region Rx. A radial coordinate change rate Wy in the radial coordinate changing region Ry is preferably less than a radial coordinate change rate Wx in the radial coordinate changing region Rx. It is preferred that the saturation enhancement process EPx includes a radial coordinate expansion process for changing the radial coordinates in the radial coordinate changing region Rx at the radial coordinate change rate Wx of greater than "1", and a radial coordinate compression process for changing the radial coordinates in the radial coordinate changing region Ry at the radial coordinate change rate Wy of less than "1". It is preferred that the saturation enhancement processing unit performs a saturation enhancement process EPy for increasing a difference in saturation between coordinates in the first observation area and coordinates in a third observation area in the feature space. The first observation area is located on one side of a second boundary and the third observation area is located on the other side of the second boundary, and the second boundary differs from the first boundary.

Preferably, the first color image signal is composed of image signals of three colors, and the two or more pieces of color information is composed of a first signal ratio between the image signals of the two colors of out of the image signals of the three colors and a second signal ratio between the image signals of the two colors out of the image signals of the three colors, and one of the colors of the image signals of the second signal ratio differs from the colors of the image signals of the first signal ratio. The feature space is preferably a signal ratio space formed by the first and second signal ratios. It is preferred that the first signal ratio correlates with a blood vessel depth and the second signal ratio correlates with a blood volume. It is preferred that the first signal ratio is a B/G ratio and the second signal ratio is a G/R ratio. It is preferred that the feature space is any one of Cb-Cr space formed by chrominance signals Cr and Cb, being the two or more pieces of color information, and ab space formed by color components a* and b*, being the two or more pieces of color information, in a CIE Lab space.

It is preferred that the two or more pieces of color information are hue H and saturation S, and the feature space is an HS space formed by the hue H and the saturation S. The coordinates in the first observation area and the coordinates in the second observation area preferably are moved in a saturation direction in the HS space by the saturation enhancement process EPx such that the coordinates in the first observation area and the coordinates in the second observation area are moved away from the first boundary. The saturation enhancement processing unit preferably performs a saturation enhancement process EPy for increasing a difference in saturation between coordinates in the first observation area and coordinates in a third observation area in the HS space. Preferably, the first observation area is located on one side of a second boundary and the third observation area is located on the other side of the second boundary, and the second boundary differs from the first boundary.

It is preferred that the medical image processing device further includes a color image signal converter and a brightness adjuster. The color image signal converter converts the two or more pieces of color information, which have been subjected to the saturation enhancement process EPx in the saturation enhancement processing unit, into a second color image signal. The brightness adjuster adjusts a pixel value of the second color image signal based on first brightness information obtained from the first color image signal and second brightness information obtained from the second color image signal.

A method for operating a medical image processing device according to the present invention includes an input process step, a color information obtaining step, and a saturation enhancement process step. In the input process step, an input processing unit performs an input process of a first color image signal. In the color information obtaining step, a color information obtaining section obtains two or more pieces of color information from the first color image signal. In the saturation enhancement process step, a saturation enhancement processing unit performs a saturation enhancement process EPx for increasing a difference in saturation between coordinates in a first observation area and coordinates in a second observation area in a feature space formed by the two or more pieces of color information. The first observation area is located on one side of a first boundary, and the second observation area is located on the other side of the first boundary.

According to the present invention, the feature space is formed by not only one piece of color information such as the G/R ratio but also two or more pieces of color information to which another piece of color information such as B/G ratio is added, and the saturation enhancement process is performed in the feature space. Thereby, it becomes possible to display an image allowing the distinction between the *H. pylori* infection and the successful eradication of the *H. pylori* infection.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

First Embodiment

Figure 1:
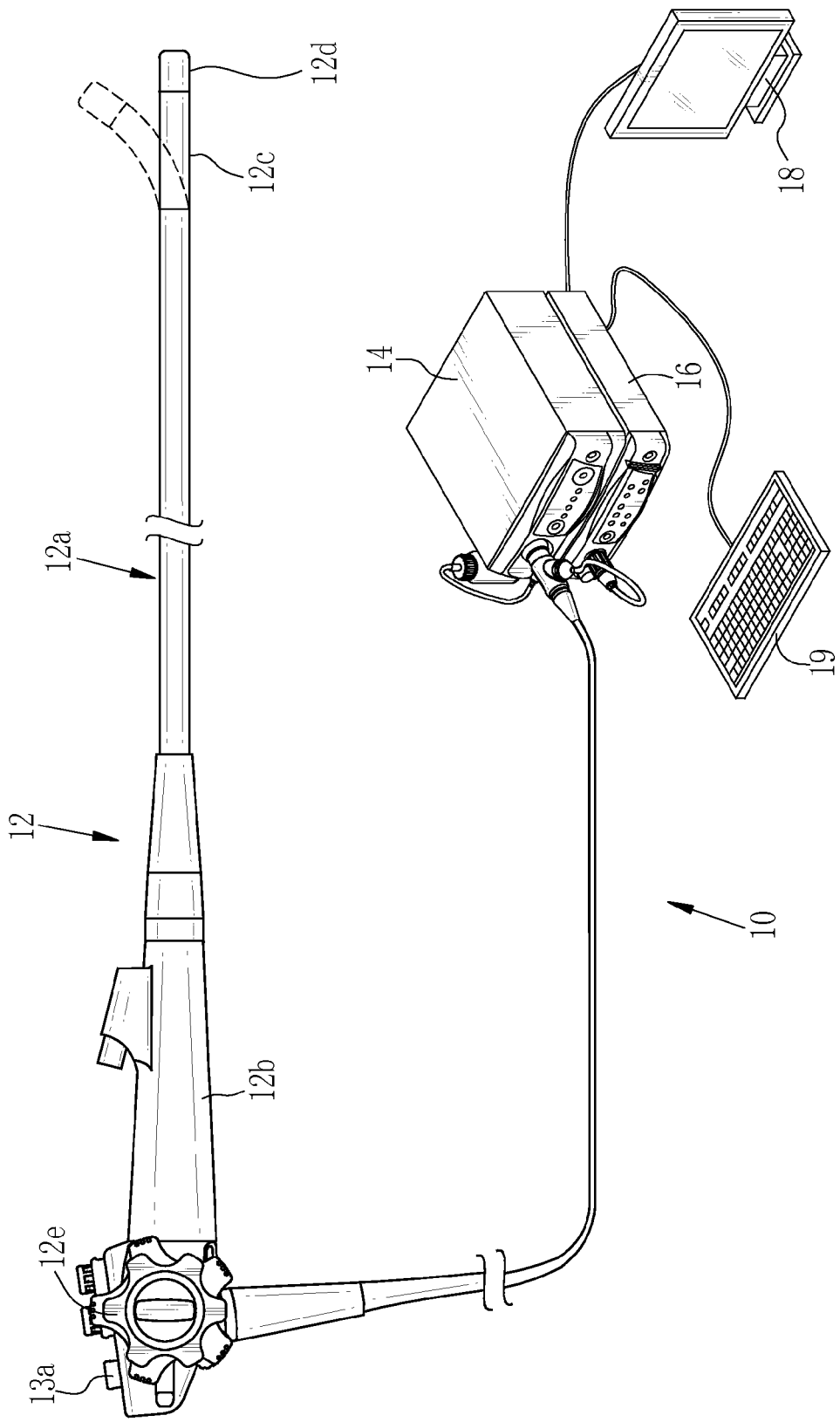
FIG. 1 is an external view of an endoscope system according to a first embodiment.

As illustrated in FIG. 1, an endoscope system 10 of a first embodiment includes an endoscope 12, a light source device 14, a processor device 16, a monitor 18, and a console 19. The endoscope 12 is connected optically to the light source device 14, and electrically to the processor device 16. The endoscope 12 includes an insertion section 12a to be inserted into a subject under inspection (hereinafter simply referred to as the subject), a control handle unit 12b provided at a proximal end of the insertion section 12a, a flexible portion 12c, and a distal portion 12d. The distal portion 12d is coupled to the flexible portion 12c, which is provided on the distal side of the insertion section 12a. The flexible portion 12c is bent by operating an angle knob 12e of the control handle unit 12b. The distal portion 12d is directed to a desired direction by bending the flexible portion 12c.

The control handle unit 12b is provided with the angle knob 12e and a mode switch (SW) 13a. The mode SW 13a is operated to switch among three modes: a normal observation mode, a first special observation mode, and a second special observation mode. In the normal observation mode, a normal image of a subject is displayed on the monitor 18. The first special observation mode is used to determine whether the eradication (removal) of *Helicobacter pylori* (*H. pylori*) infection has been successful. In the first special observation mode, a first special image is displayed on the monitor 18. The second special observation mode is used to detect or determine the *H. pylori* infection. In the second special observation mode, a second special image is displayed on the monitor 18.

The processor device 16 is electrically connected to the monitor 18 and the console 19. The monitor 18 outputs and displays image information and the like. The console 19 serves as a UI (user interface), which receives an input operation such as setting of functions. Note that, an external storage unit (not shown in the drawing) for recording the image information and the like may be connected to the processor device 16.

Figure 2:
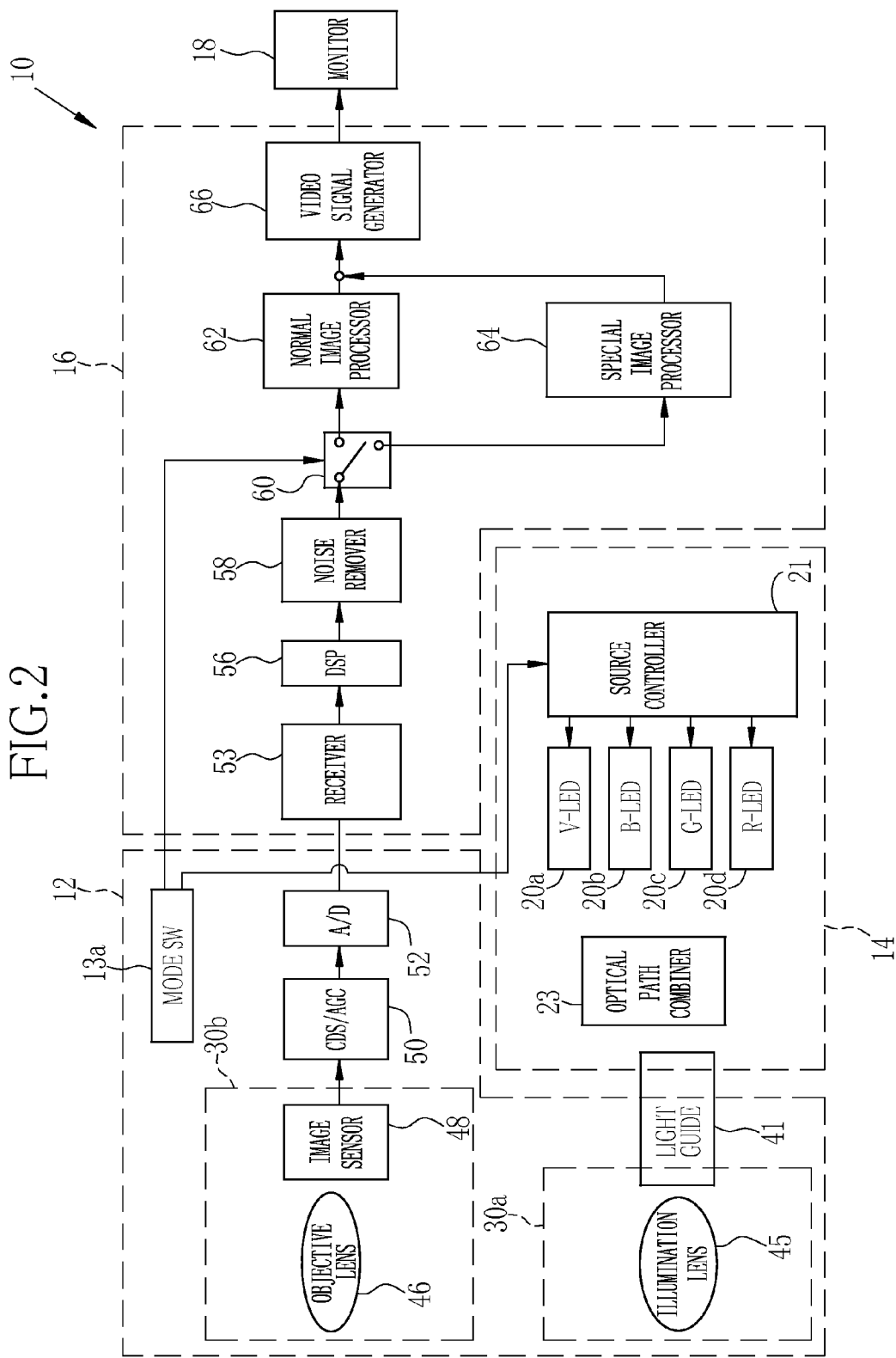
FIG. 2 is a block diagram illustrating functions of the endoscope system according to the first embodiment.

As illustrated in FIG. 2, the light source device 14 includes a V-LED (Violet Light Emitting Diode) 20a, a B-LED (Blue Light Emitting Diode) 20b, a G-LED (Green Light Emitting Diode) 20c, an R-LED (Red Light Emitting Diode) 20d, a source controller 21 for controlling an operation of each of the LEDs 20a to 20d, and an optical path combiner 23. The optical path combiner 23 combines the optical paths of four colors of light emitted from the four colors of LEDs 20a to 20d together. The light combined by the optical path combiner 23 is applied to the inside of the subject through a light guide (LG) 41 and a illumination lens 45. The light guide 41 extends inside the insertion section 12a. Incidentally, an LD (Laser Diode) may be used in place of the LED.

Figure 3:
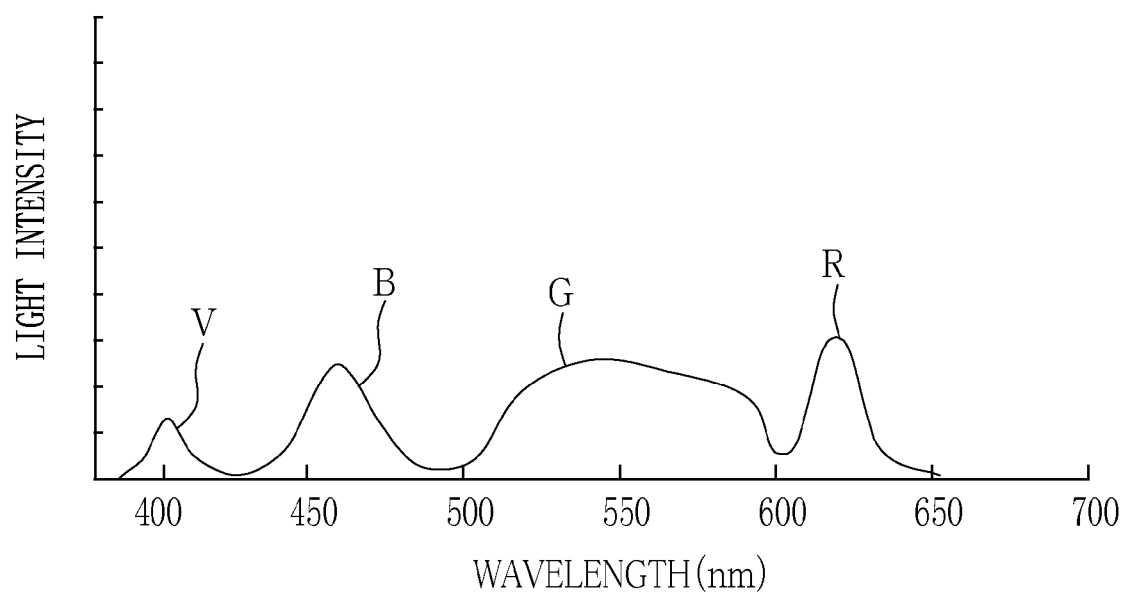
FIG. 3 is a graph illustrating an emission spectra of violet light V, blue light B, green light G, and red light R.

As illustrated in FIG. 3, the V-LED 20a generates violet light V having a wavelength range of 380 to 420 nm and the center wavelength of 405±10 nm. The B-LED 20b generates blue light B having a wavelength range of 420 to 500 nm and the center wavelength of 460±10 nm. The G-LED 20c generates green light G having a wavelength range of 480 to 600 nm. The R-LED 20d generates red light R having a wavelength range of 600 to 650 nm and the center of wavelength of 620 to 630 nm.

In each of the normal observation mode, the first special observation mode, and the second special observation mode, the source controller 21 turns on the V-LED 20a, the B-LED 20b, the G-LED 20c, and the R-LED 20d. In other words, the mixture of the violet light V, the blue light B, the green light G, and the red light R is applied to an observation target (i.e., the subject). In the normal observation mode, the source controller 21 controls the LEDs 20a to 20d to make a light quantity ratio among the violet light V, the blue light B, the green light G, and the red light R to be Vc:Bc:Gc:Rc. In the first and second special observation modes, the source controller 21 controls the LEDs 20a to 20d to make the light quantity ratio among the violet light V, the blue light B, the green light G, and the red light R to be Vs:Bs:Gs:Rs.

As illustrated in FIG. 2, the light guide 41 extends inside the endoscope 12 and a universal cord for connecting the endoscope 12, the light source device 14, and the processor device 16. The light guide 41 transmits the light combined by the optical path combiner 23 to the distal portion 12d of the endoscope 12. Note that, a multimode fiber may be used as the light guide 41. For example, a small-diameter fiber cable with a core diameter of 105 μm, a clad diameter of 125 μm, and an outer diameter φ of 0.3 to 0.5 mm (including a protection layer, being a jacket) may be used.

The distal portion 12d of the endoscope 12 includes an illumination optical system 30a and an imaging optical system 30b. The illumination optical system 30a has the illumination lens 45. The light from the light guide 41 is applied to the observation target through the illumination lens 45. The imaging optical system 30b has an objective lens 46 and an image sensor 48. The reflection light from the observation target is incident on the image sensor 48 through the objective lens 46. Thereby, a reflection image of the observation target is formed on the image sensor 48.

The image sensor 48 is a color image sensor. The image sensor 48 captures the reflection image of the subject, and outputs an image signal. It is preferred that the image sensor is a CCD (Charge Coupled Device) image sensor, a CMOS (Complementary Metal-Oxide Semiconductor) image sensor, or the like. The image sensor 48 used in the present invention is a color image sensor for obtaining image signals of three colors, R (red), G (green), and B (blue), that is, a so-called RGB image sensor including R pixels with R filters, G pixels with G filters, and B pixels with B filters.

Note that, the image sensor 48 may be a so-called complementary color image sensor instead of the RGB image sensor. The complementary color image sensor has complementary color filters of C (cyan), M (magenta), Y (yellow), and G (green). In the case where the complementary color image sensor is used, four colors (CMYG) of image signals are outputted. It is necessary to convert the four colors (CMYG) of image signals into three colors (RGB) of image signals through complementary color/primary color conversion. Alternatively, the image sensor 48 may be a monochrome image sensor with no color filters. In this case, it is necessary that the source controller 21 applies the blue light B, the green light G, and the red light R in a time-division manner. It is also necessary to synchronize the processing of the image signals.

The image signal outputted from the image sensor 48 is transmitted to a CDS/AGC circuit 50. The CDS/AGC circuit 50 performs correlated double sampling (CDS) and automatic gain control (AGC) on the image signal, being an analog signal. The image signal which has passed through the CDS/AGC circuit 50 is converted into a digital image signal by an A/D (Analog/Digital) converter 52. The A/D converted digital image signal is inputted to the processor device 16.

The processor device 16 includes a receiver 53, a DSP (Digital Signal Processor) 56, a noise remover 58, an image processing selector 60, a normal image processor 62, a special image processor 64, and a video signal generator 66. The receiver 53 receives the digital RGB image signals from the endoscope 12. The R image signal corresponds to (or refers to) signals outputted from the R pixels of the image sensor 48. The G image signal corresponds to (or refers to) signals outputted from the G pixels of the image sensor 48. The B image signal corresponds to (or refers to) signals outputted from the B pixels of the image sensor 48.

The DSP 56 performs various types of signal processing (defect correction process, offset processing, gain correction process, linear matrix processing, gamma conversion process, demosaicing process, and the like) on the received image signal. In the defect correction process, signals from defective pixels in the image sensor 48 are corrected. In the offset processing, dark current components are removed from the RGB image signals which have been subjected to the defect correction process. Thereby, an accurate zero level is set. In the gain correction process, a signal level is adjusted or corrected by multiplying a specific gain to the RGB image signals after the offset processing. After the gain correction process, the RGB image signals are subjected to the linear matrix processing to increase color reproducibility. Thereafter, brightness and saturation are adjusted or corrected through the gamma conversion process. After the linear matrix processing, the RGB image signals are subjected to the demosaicing process (also referred to as equalization process) in which color signal(s) lacking in each pixel is generated by interpolation. Owing to the demosaicing process, each pixel has three colors (RGB) of signals.

The DSP 56 performs gamma correction and the like on the RGB image signals. Thereafter, the noise remover 58 removes noise from the RGB image signals through a noise removing process (for example, moving average method or median filter method). Then, the RGB image signals are transmitted to the image processing selector 60. Note that, "input processing unit" of the present invention corresponds to the configuration including the receiver 53, the DSP 56, and the noise remover 58.

In the normal observation mode, which is set using the mode SW 13a, the image processing selector 60 transmits the RGB image signals to the normal image processor 62. In the case where the mode is set to the first special observation mode or the second special observation mode, the image processing selector 60 transmits the RGB image signals to the special image processor 64.

The normal image processor 62 performs color conversion process, color enhancement process, and structure enhancement process on the RGB image signals. In the color conversion process, the digital RGB image signals are subjected to 3×3 matrix processing, tone conversion process, three-dimensional LUT process, and the like. Thereby, the digital RGB image signals are converted into the color-converted RGB image signals. Next, the color-converted RGB image signals are subjected to various types of color enhancement processes. The color-enhanced RGB image signals are subjected to the structure enhancement process (e.g. spatial frequency enhancement and the like). The structure-enhanced RGB image signals are inputted as the RGB image signals of the normal image from the normal image processor 62 to the video signal generator 66.

The special image processor 64 produces the first special image or the second special image based on the RGB image signals. In the first special image, a difference in color of the observation target between a portion infected with the *H. pylori* and a portion in which the *H. pylori* infection has been eradicated successfully is enhanced. In the second special image, a difference in color of the observation target between the portion infected with the *H. pylori* and a portion uninfected with the *H. pylori* is enhanced. The special image processor 64 will be described in detail below. The RGB image signals of the first or second special image, which is produced by the special image processor 64, are inputted to the video signal generator 66.

The video signal generator 66 converts the RGB image signals, which are inputted from the normal image processor 62 or the special image processor 64, into a video signal to be displayed as an image on the monitor 18. The monitor 18 displays the normal image, the first special image, or the second special image based on the video signal.

Figure 4:
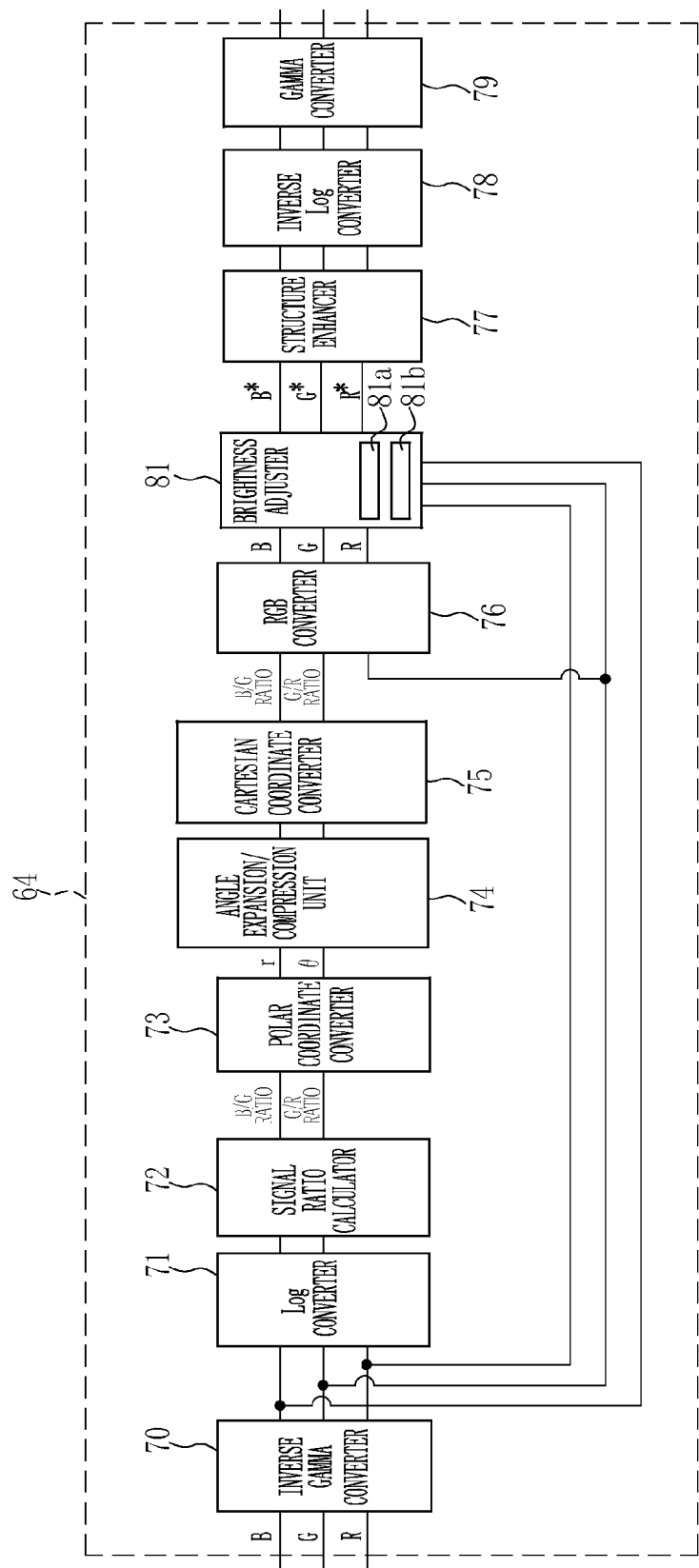
FIG. 4 is a block diagram illustrating functions of a special image processor for performing first and second processes in the case where a feature space is a signal ratio space.

As illustrated in FIG. 4, the special image processor 64 includes an inverse gamma converter 70, a log converter 71, a signal ratio calculator 72, a polar coordinate converter 73, an angle expansion/compression unit 74, a Cartesian coordinate converter 75, an RGB converter 76, a structure enhancer 77, an inverse log converter 78, and a gamma converter 79. The special image processor 64 also includes a brightness adjuster 81 between the RGB converter 76 and the structure enhancer 77.

The inverse gamma converter 70 performs inverse gamma conversion on the inputted digital image signal of the RGB channels. The RGB image signals after the inverse gamma conversion are linearly-changing RGB signals which change linearly relative to reflectance from the subject. Owing to this, a proportion of the signal components related to various types of biological information of the subject increases in the RGB image signals. Note that, the linearly-changing R image signal is referred to as a first R image signal. The linearly-changing G image signal is referred to as a first G image signal. The linearly-changing B image signal is referred to as a first B image signal.

The log converter 71 performs log conversion of each of the linearly-changing RGB image signals (which corresponds to "first color image signal" of the present invention). Thereby, log-converted R image signal (log R), log-converted G image signal (log G), and log-converted B image signal (log B) are obtained. The signal ratio calculator 72 (which corresponds to a "color information obtaining section" of the present invention) performs difference processing (log G−log B=log G/B=−log(B/G)) based on the log-converted G image signal and the log-converted B image signal. Thereby, the B/G ratio is calculated. The B/G ratio refers to −log(B/G) with the "−log" omitted. The G/R ratio is calculated by difference processing (log R−log G=log R/G=−log(G/R)) based on the log-converted R image signal and the log-converted G image signal. The G/R ratio refers to −log (G/R) with the "−log" omitted in a manner similar to the B/G ratio.

Note that, the B/G ratio and the G/R ratio are calculated with respect to the pixels in the same positions in the B image signal, the G image signal, and the R image signal. The B/G ratio and the G/R ratio are calculated for each pixel. The B/G ratio correlates with a blood vessel depth (distance between a mucosal surface and a position of a specific blood vessel), so that the B/G ratio varies in accordance with the blood vessel depth. The G/R ratio correlates with the blood volume (hemoglobin index), so that the G/R ratio varies in accordance with the blood volume.

The polar coordinate converter 73 converts the B/G ratio and the G/R ratio, which are calculated by the signal ratio calculator 72, into a radial coordinate r and an angular coordinate θ. The polar coordinate converter 73 performs the conversion into the radial coordinate r and the angular coordinate θ for each pixel. In the first special observation mode, the angle expansion/compression unit 74 performs a first process. The first process refers to increasing the difference between a first observation area and a second observation area. In the first observation area, the radial coordinates r and the angular coordinates θ corresponding to a portion of the subject infected with the *H. pylori* are distributed. In the second observation area, the radial coordinates r and the angular coordinates θ corresponding to a portion of the subject in which the eradication of the *H. pylori* infection has been successful are distributed. In the second special observation mode, the angle expansion/compression unit 74 performs a second process. The second process refers to increasing the difference between the first observation area and a third observation area. In the first observation area, the radial coordinates r and the angular coordinates θ corresponding to a portion of the subject infected with the *H. pylori* are distributed. In the third observation area, the radial coordinates r and the angular coordinates θ corresponding to a portion of the subject uninfected with the *H. pylori* are distributed. The first and second processes will be described in details below.

The Cartesian coordinate converter 75 converts the angle-expanded or angle-compressed radial coordinate r and angular coordinate θ, which have passed through the angle expansion/compression unit 74, into Cartesian coordinates. Thereby, the angle-expanded or angle-compressed B/G and G/R ratios are obtained. The RGB converter 76 (which corresponds to a "color image signal converter" of the present invention) uses at least one of the first RGB image signals to convert the angle-expanded or angle-compressed B/G and G/R ratios into the RGB image signals. To convert the B/G ratio into a second B image signal, the RGB converter 76 performs arithmetic operations based on the B/G ratio and the G image signal of the first RGB image signals, for example. To convert the G/R ratio into a second R image signal, the RGB converter 76 performs arithmetic operations based on the G/R ratio and the G image signal of the first RGB image signals, for example. The RGB converter 76 outputs the first G image signal as a second G image signal, without any conversion.

The brightness adjuster 81 adjusts or corrects the pixel values of the second RGB image signals based on the first RGB image signals and the second RGB image signals. A reason for adjusting the pixel values of the second RGB image signals by the brightness adjuster 81 is as follows. Brightness of the second RGB image signals, which are obtained by the expansion and compression processes in the color region by the angle expansion/compression unit 74, may become significantly different from brightness of the first RGB image signals. Accordingly, the brightness adjuster 81 adjusts the pixel values of the second RGB image signals to make the brightness of the second RGB image signals after the brightness adjustment equal to the brightness of the first RGB image signals.

The brightness adjuster 81 includes a first brightness information calculator 81a and a second brightness information calculator 81b. The first brightness information calculator 81a calculates first brightness information Yin based on the first RGB image signals. The second brightness information calculator 81b calculates second brightness information Yout based on the second RGB image signals. The first brightness information calculator 81a calculates the first brightness information Yin with the use of an arithmetic expression "kr×pixel value of first R image signal+kg×pixel value of first G image signal+kb×pixel value of first B image signal". The second brightness information calculator 81b calculates the second brightness information Yout in a manner similar to that of the first brightness information calculator 81a, with the use of an arithmetic expression similar to that described above. After calculating the first brightness information Yin and the second brightness information Yout, the brightness adjuster 81 performs arithmetic operations based on the expressions (E1) to (E3) below, and thereby adjusts the pixel values of the second RGB image signals.

$R^* = $ pixel value of second $R$ image signal × Yin/Yout  (E1)

$G^* = $ pixel value of second $G$ image signal × Yin/Yout  (E2)

$B^* = $ pixel value of second $B$ image signal × Yin/Yout  (E3)

Note that, "R*" denotes the second R image signal after the brightness adjustment. "G*" denotes the second G image signal after the brightness adjustment. "B*" denotes the second B image signal after the brightness adjustment. Each of "kr", "kg", and "kb" is an arbitrary constant within a range of "0" to "1".

The structure enhancer 77 performs the structure enhancement process (e.g. frequency filtering or the like) on the second RGB image signals which have passed through the RGB converter 76. The inverse log converter 78 performs inverse log conversion on the second RGB image signals which have passed through the structure enhancer 77. Thereby, the second RGB image signals with antilogarithmic pixel values are obtained. The gamma converter 79 performs the gamma conversion on the RGB image signals which have passed through the inverse log converter 78. Thereby, the second RGB image signals with the tone suitable for an output device such as the monitor 18 are obtained. The RGB image signals, which have passed through the gamma converter 79, are transmitted as the RGB image signals of the first or second special image to the video signal generator 66.

Figure 5:
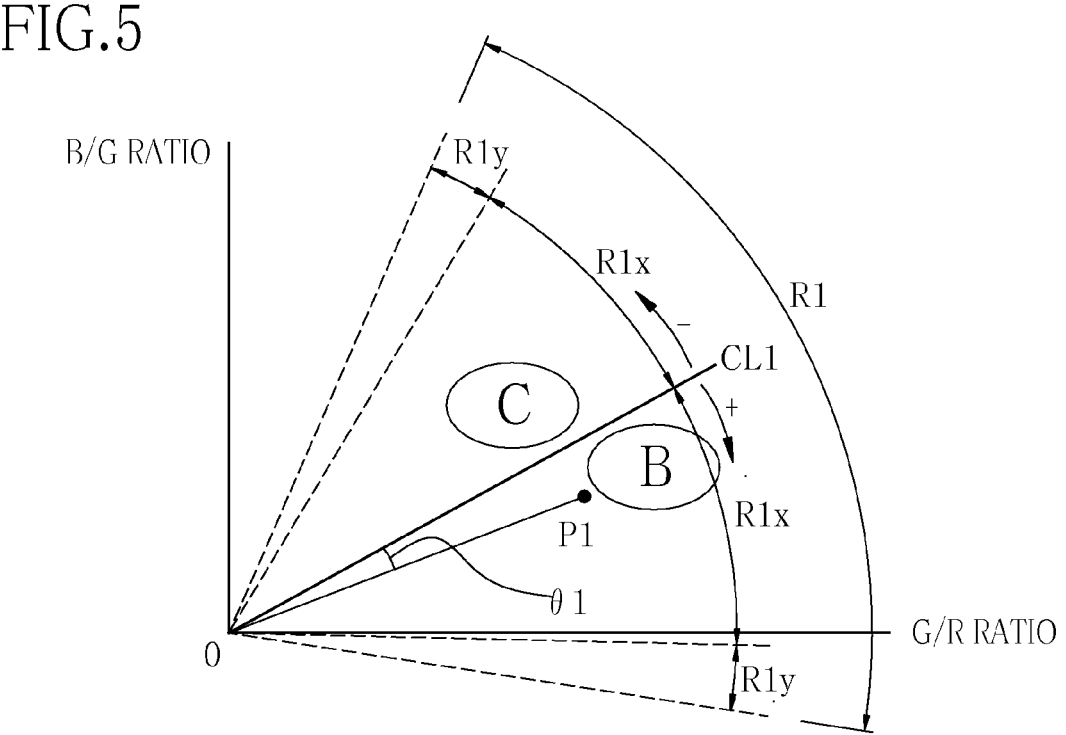
FIG. 5 is an explanatory view illustrating the first process for the signal ratio space.

The first and second processes performed by the angle expansion/compression unit 74 are described below using a feature space (hereinafter referred to as signal ratio space), being a two-dimensional color space formed by the B/G ratio (vertical axis) and the G/R ratio (horizontal axis) as illustrated in FIG. 5. In the first process for the signal ratio space, a region including the first observation area (denoted as "B" in FIG. 5 and so forth) and the second observation area (denoted as "C" in FIG. 5 and so forth) is set as an angle changing region R1 in the signal ratio space. In the first observation area, the coordinates corresponding to a portion infected with the *H. pylori* are distributed. In the second observation area, the coordinates corresponding to a portion in which the eradication of the *H. pylori* infection has been successful are distributed. Then, the angles θ of the coordinates in the angle changing region R1 are changed while the angles θ of the coordinates outside the angle changing region R1 are not changed. In the first process for the signal ratio space, the radial coordinates r of the coordinates in the angle changing region R1 are not changed.

In the angle changing region R1, a first center line CL1 is set to a portion which is considered to be the boundary between the first observation area "B" and the second observation area "C". Coordinates (point) P1 within the angle changing region R1 are defined by an angle "θ1" from the first center line CL1. The angle θ1 is defined as a positive value in the case where the angle θ1 is situated in the clockwise direction from the first center line CL1. The angle θ1 is defined as a negative value in the case where the angle θ1 is situated in the counterclockwise direction from the first center line CL1.

In the first process for the signal ratio space, a first expansion process is performed on the coordinates in an angle changing region R1x, which extends from the first center line CL1 to a specific extent, within the angle changing region R1. In the first expansion process, the angle θ1 is changed at an angle change rate W1x of greater than "1". A first compression process is performed on the coordinates in an angle changing region R1y, which is outside the angle changing region R1x. In the first compression process, the angle θ1 is changed at an angle change rate W1y of less than "1". The coordinates in the angle changing region R1 are moved from the first center line CL1 to some extent by the first expansion process and the first compression process. Note that, the angle θ does not change at the angle change rate of "1".

Figure 6:
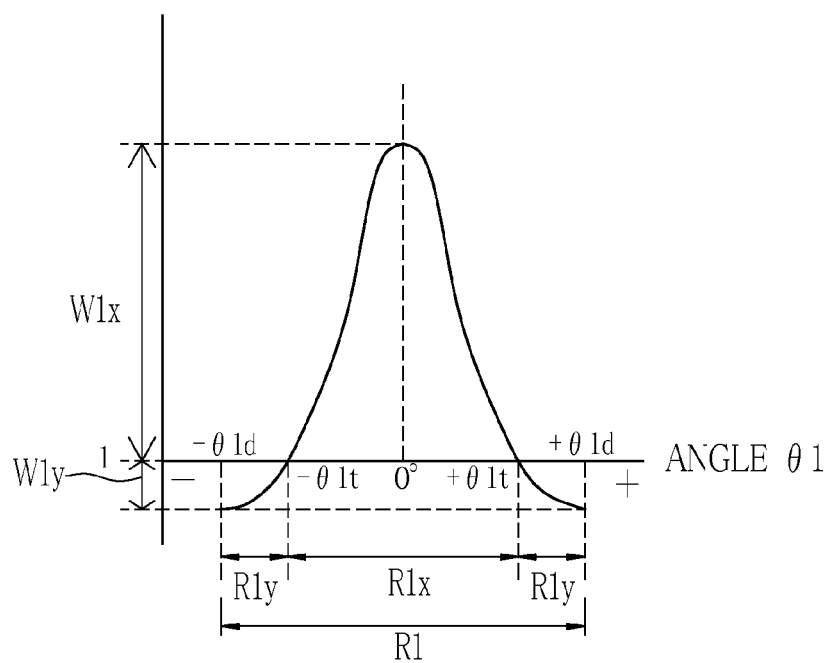
FIG. 6 is a graph illustrating a relationship between an angle $\theta 1$ and an angle change rate at the first process for the signal ratio space.

As shown in FIG. 6, the angle change rate W1x is set to have the highest value when the angle θ1 is "0°". Further, the angle change rate W1x is set to gradually decrease as the angle θ1 decreases or increases from "0°" in the case where the angle θ1 is between "0°" and an angle "−θ1t" or an angle "+θ1t" which represents a boundary division between the angle changing region R1x and the angle changing region R1y. Furthermore, the angle change rate W1y is set to gradually decrease as the angle θ1 decreases from the angle "−θ1t" in the case where the angle θ1 is between the angle "−θ1t" and an angle "−θ1d" which represents a minimum value of the angle changing region R1, and the angle change rate W1y is set to gradually decrease as the angle θ1 increases from the angle "+θ1t" in the case where the angle θ1 is between the angle "+θ1t" and an angle "+θ1d" which represents a maximum value of the angle changing region R1.

Figure 7:
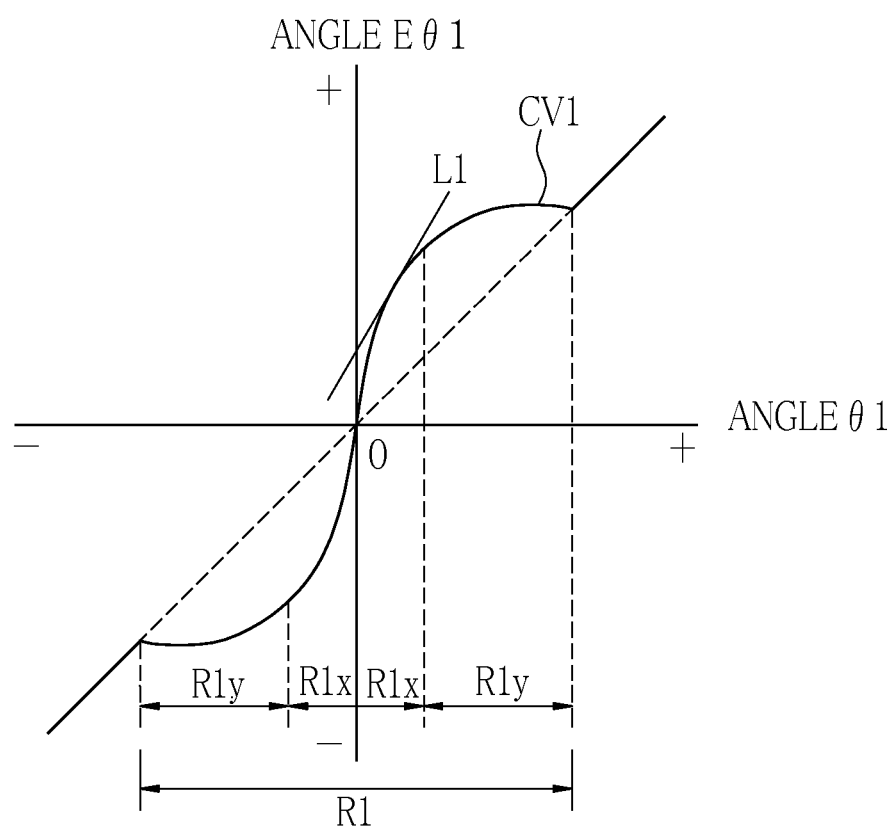
FIG. 7 is a graph illustrating a relationship between the angle $\theta 1$ and an angle $E\theta 1$ after the first process for the signal ratio space.

Note that, each of the angle change rates W1x and W1y is represented by the inclination of a straight line "L1", being a tangent line of a curve CV1. The curve CV1 depicts the relationship between the angle θ1 and an angle Eθ1 (see FIG. 7). The inclination of the straight line L1 is greater than "1" in the angle changing region R1x. On the other hand, the inclination of the straight line L1 is less than "1" in the angle changing region R1y. The inclination of the straight line L1 outside the angle changing region R1 is "1".

By performing the first process for the signal ratio space, which is composed of the first expansion process and the first compression process as described above, as illustrated in FIG. 7, the angle θ1 on the positive side is changed to a positive angle Eθ1 that is greater than the angle θ1, while the angle θ1 on the negative side is changed to a negative angle Eθ1 that is smaller than the angle θ1. In contrast, the angle θ of the coordinates outside the angle changing region R1 is changed to the angle Eθ that is equivalent to the angle θ (identical transformation).

Figure 8A:
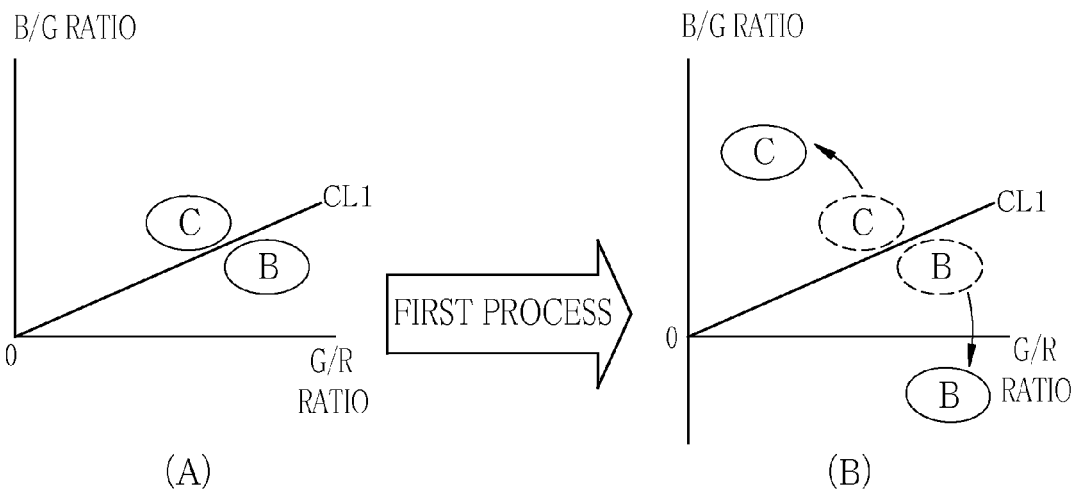
FIG. 8A is an explanatory view illustrating an operation and effects of the first process for the signal ratio space.

The following operation and effects are obtained by changing the angle. As illustrated in a graph (A) in FIG. 8A, before the first process for the signal ratio space, the first observation area "B" and the second observation area "C" are close to each other. After the first process for the signal ratio space, as illustrated in a graph (B) in FIG. 8A, most of the coordinates corresponding to the first observation area "B" are moved in the clockwise direction with respect to the first center line CL1, while most of the coordinates corresponding to the second observation area "C" are moved in the counterclockwise direction with respect to the first center line CL. Thus, the difference in hue between the first observation area "B" and the second observation area "C" is increased. In the first special image, in which the difference in hue between the first observation area "B" and the second observation area "C" is increased, the difference in color of the observation target between the portion infected with the H. pylori and the portion in which the eradication of the H. pylori infection has been successful becomes distinct or apparent. Thereby, whether the eradication of the H. pylori infection has been successful is diagnosed reliably.

The region extending between ±90° from the first center line CL1 is a specific color region in which a difference in color (referred to as the "color difference" in this paragraph) of the observation target between a portion infected with the H. Pylori and a portion in which the eradication of the H. pylori infection has been successful is emphasized by changing the angle. In the region beyond (outside) the specific color region extending between ±90° from the first center line CL1, the color difference is not emphasized by changing the angle. For this reason, in the first process for the signal ratio space, the first compression process is performed in addition to the first expansion process, so that the angle Eθ1 after the angle change is within the specific color region extending between ±90° from the first center line CL1. Thus, in the first special image, the color difference in the specific color region is emphasized while the color difference in the region outside the specific color region is not emphasized.

Figure 8B:
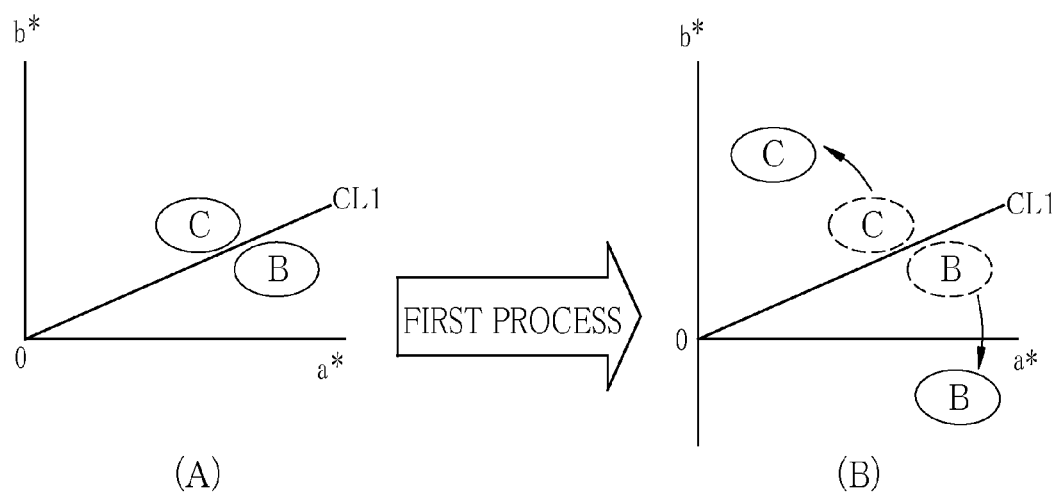
FIG. 8B is an explanatory view illustrating an operation and effects of the first process in the case where the feature space is an ab space.

Note that, as illustrated in FIG. 8B, in the case of the feature space (ab space) formed by a* and b* (color components a* and b*, being the color information, in a CIE Lab space, the same hereinafter), which are obtained by Lab conversion of the first RGB image signals performed by a Lab converter, most of the coordinates corresponding to the first observation area "B" are moved in the clockwise direction with respect to the first center line CL1 while most of the coordinates in the second observation area "C" are moved in the counterclockwise direction with respect to the first center line CL1 by the first process for the ab space. Here, in FIG. 8B, a graph (A) depicts the distribution of the first and second observation areas before the first process for the ab space and a graph (B) depicts the distribution of the first and second observation areas after the first process for the ab space (the same holds true for graphs (A) and (B) in FIG. 12B). Further, it is preferred that the brightness adjuster 81 adjusts the pixel values of the second RGB image signals obtained after the first process for the ab space. The method for adjusting the pixel values of the second RGB image signals is the same as the above.

Figure 9:
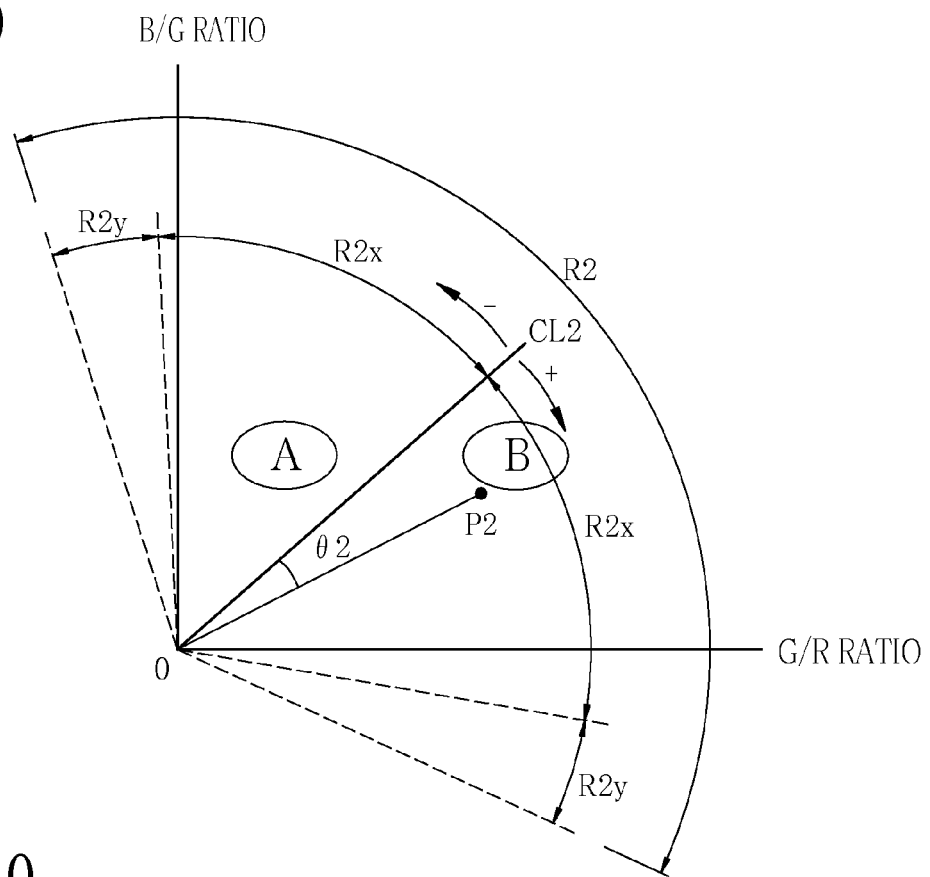
FIG. 9 is an explanatory view illustrating the second process for the signal ratio space.

As illustrated in FIG. 9, in the second process for the signal ratio space, a region including the first observation area (denoted as "B") and the third observation area (denoted as "A" in FIG. 9 and so forth) is set as an angle changing region R2 in the signal ratio space. In the first observation area "B", the coordinates corresponding to a portion of the subject infected with the H. pylori are distributed. In the third observation area "A", the coordinates corresponding to a portion of the subject uninfected with the H. pylori are distributed. The angle θ of the coordinates within the angle changing region R2 is changed, while the angle θ of the coordinates outside the angle changing region R2 is not changed. In the second process for the signal ratio space, the radial coordinate r of the coordinates within the angle changing region R2 is not changed.

In the angle changing region R2, a second center line CL2 is set between the first observation area "B" and the third observation area "A". The angle changing region R2 is greater in size than the angle changing region R1. The inclination of the second center line CL2 in the signal ratio space is set to be greater than that of the first center line CL1. Coordinates (point) P2 in the angle changing region R2 are defined by an angle θ2 from the second center line CL2. The angle θ2 located in the clockwise direction from the second center line CL2 is defined as a positive angle. The angle θ2 located in the counterclockwise direction from the second center line CL2 is defined as a negative angle.

In the second process for the signal ratio space, a second expansion process is performed on the coordinates in an angle changing region R2x, which extends from the second center line CL2 to a specific extent within the angle changing region R2. In the second expansion process, the angle θ2 is changed at an angle change rate W2x of greater than "1". A second compression process is performed on the coordinates in an angle changing region R2y, which is outside the angle changing region R2x. In the second compression process, the angle θ2 is changed at an angle change rate W2y of less than "1". The coordinates in the angle changing region R2 are moved from the second center line CL2 to some extent by the second expansion process and the second compression process. Note that, the angle θ does not change at the angle change rate of "1".

Figure 10:
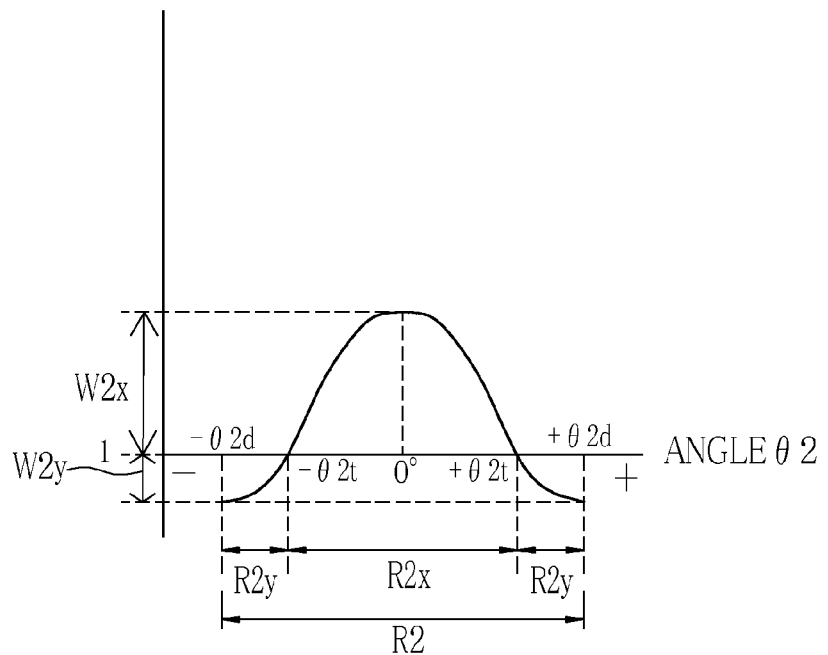
FIG. 10 is a graph illustrating a relationship between an angle $\theta 2$ and an angle change rate at the second process for the signal ratio space.

As shown in FIG. 10, the angle change rate W2x is set to have the highest value when the angle θ2 is "0°". The angle change rate W2x at the angle θ2 of "0°" is set to be less than the angle change rate W1x at the angle θ1 of "0°". Further, the angle change rate W2x is set to gradually decrease as the angle θ2 decreases or increases from "0°" in the case where the angle θ2 is between "0°" and an angle "−θ2t" or an angle "+θ2t" which represents a boundary division between the angle changing region R2x and the angle changing region R2y. Furthermore, the angle change rate W2y is set to gradually decrease as the angle θ2 decreases from the angle "−θ2t" in the case where the angle θ2 is between the angle "−θ2t" and an angle "−θ2d" which represents a minimum value of the angle changing region R2, and the angle change rate W2y is set to gradually decrease as the angle θ2 increases from the angle "+θ2t" in the case where the angle θ2 is between the angle "+θ2t" and an angle "+θ2d" which represents a maximum value of the angle changing region R2.

Figure 11:
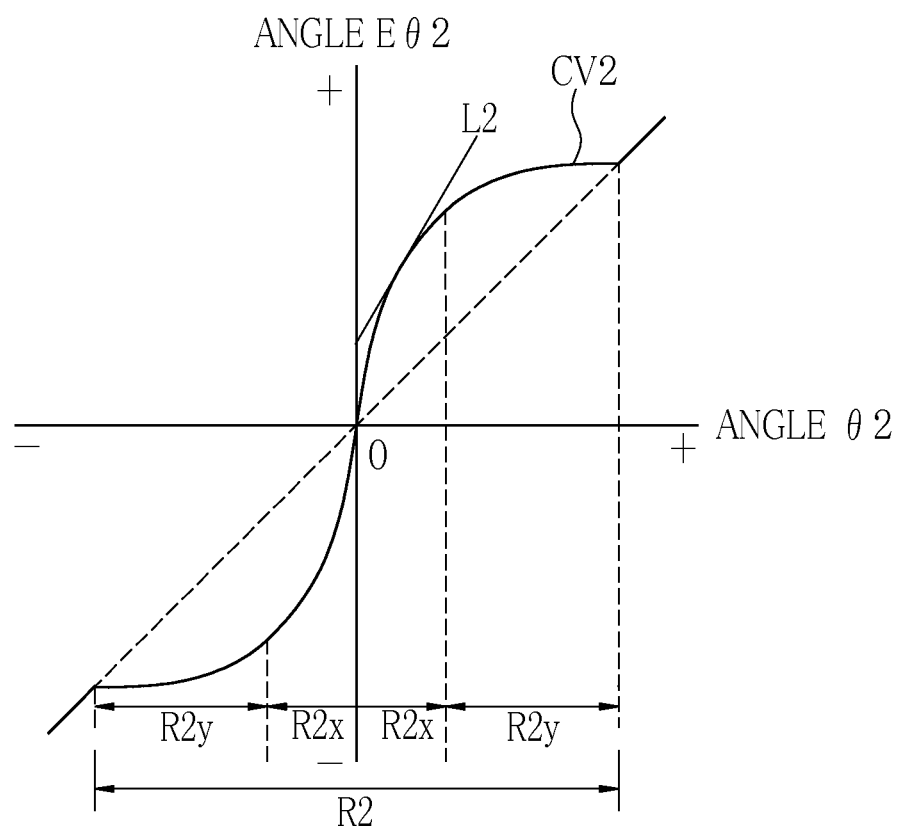
FIG. 11 is a graph illustrating a relationship between the angle $\theta 2$ and an angle $E\theta 2$ after the second process for the signal ratio space.

Note that, each of the angle change rates W2x and W2y is represented by the inclination of a straight line "L2", being a tangent line of a curve CV2. The curve CV2 depicts the relationship between the angle θ2 and an angle Eθ2 (see FIG. 11). The inclination of the straight line L2 is greater than "1" in the angle changing region R2x. On the other hand, the inclination of the straight line L2 is less than "1" in the angle changing region R2y. The inclination of the straight line L2 outside the angle changing region R2 is "1".

By performing the second process for the signal ratio space, which is composed of the second expansion process and the second compression process as described above, as illustrated in FIG. 11, the angle θ2 on the positive side is changed to a positive angle Eθ2 that is greater than the angle θ2, while the angle θ2 on the negative side is changed to a negative angle Eθ2 that is smaller than the angle θ2. In contrast, the angle θ of the coordinates outside the angle changing region R2 is changed to the angle Eθ that is equivalent to the angle θ (identical transformation).

Figure 12A:
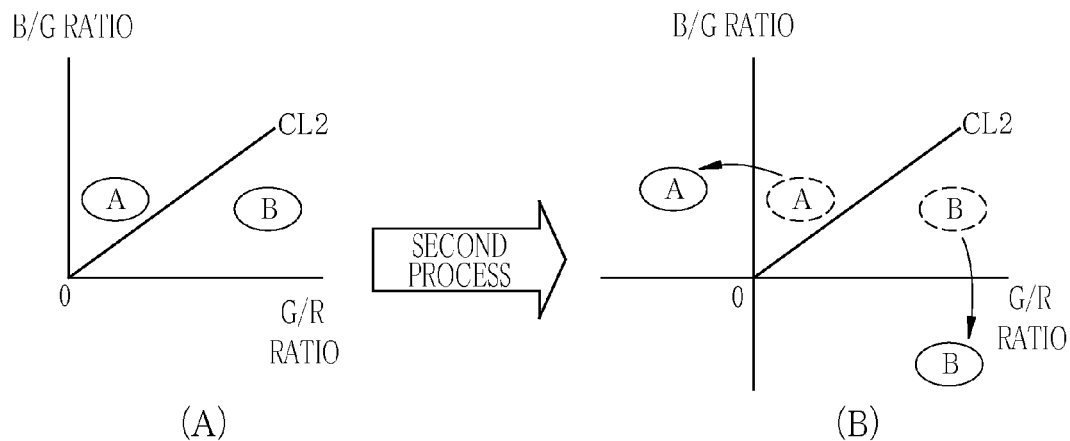
FIG. 12A is an explanatory view illustrating an operation and effects of the second process for the signal ratio space.

The following operation and the effects are obtained by changing the angle as described above. Before the second process for the signal ratio space, as illustrated in a graph (A) in FIG. 12A, the first observation area "B" and the third observation area "A" are located in the first quadrant of the signal ratio space. After the second process for the signal ratio space, as illustrated in a graph (B) in FIG. 12A, most of the coordinates corresponding to the first observation area "B" are moved in the clockwise direction with respect to the second center line CL2, while most of the coordinates corresponding to the third observation area "A" are moved in the counterclockwise direction with respect to the second centerline CL2. Thereby, most of the coordinates corresponding to the first observation area "B" are moved to the fourth quadrant of the signal ratio space, and most of the coordinates corresponding to the third observation area "A" are moved to the second quadrant of the signal ratio space. Thus, the difference in hue between the first observation area "B" and the third observation area "A" is further increased. In the second special image, which is produced by further increasing the difference in hue between the first observation area "B" and the third observation area "A", the difference in color of the observation target between a portion infected with the H. pylori and a portion uninfected with the H. pylori is distinct or apparent. As a result, the infection with the H. pylori is diagnosed reliably.

In the second process for the signal ratio space, the second compression process is performed in addition to the second expansion process, so that the angle Eθ2 after the angle change is within a specific color region extending between ±90° from the second center line CL2. Thereby, the color difference is emphasized in the specific color region in the second special image, and the color difference is not emphasized in the color region other than the specific color region.

Figure 12B:
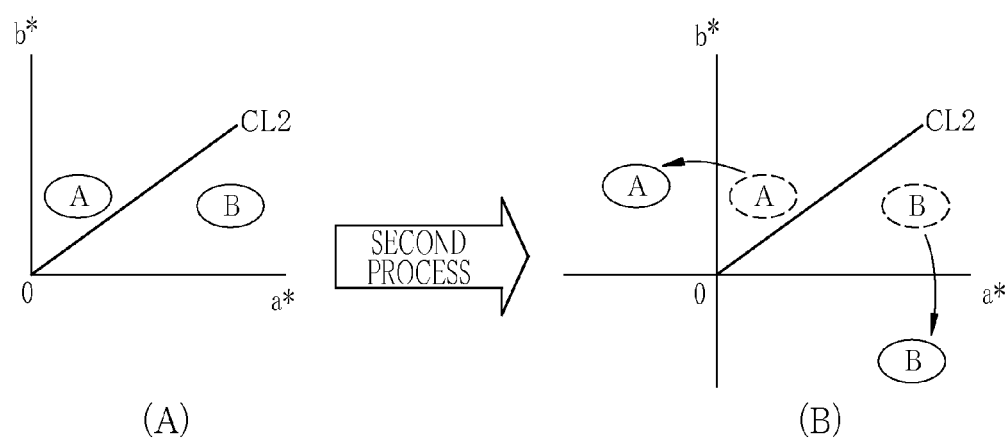
FIG. 12B is an explanatory view illustrating an operation and effects of the second process in the case where the feature space is the ab space.

Note that, as illustrated in FIG. 12B, in the case of the feature space (the ab space) formed by the color components a* and b* which are obtained by the Lab conversion of the first RGB image signals performed by the Lab converter, most of the coordinates corresponding to the first observation area "B" are moved in the clockwise direction with respect to the second center line CL2 while most of the coordinates in the third observation area "A" are moved in the counterclockwise direction with respect to the second center line CL2 by the second process for the ab space. Further, it is preferred that the brightness adjuster 81 adjusts the pixel values of the second RGB image signals obtained after the second process for the ab space. The method for adjusting the pixel values of the second RGB image signals is the same as the above.

Figure 13:
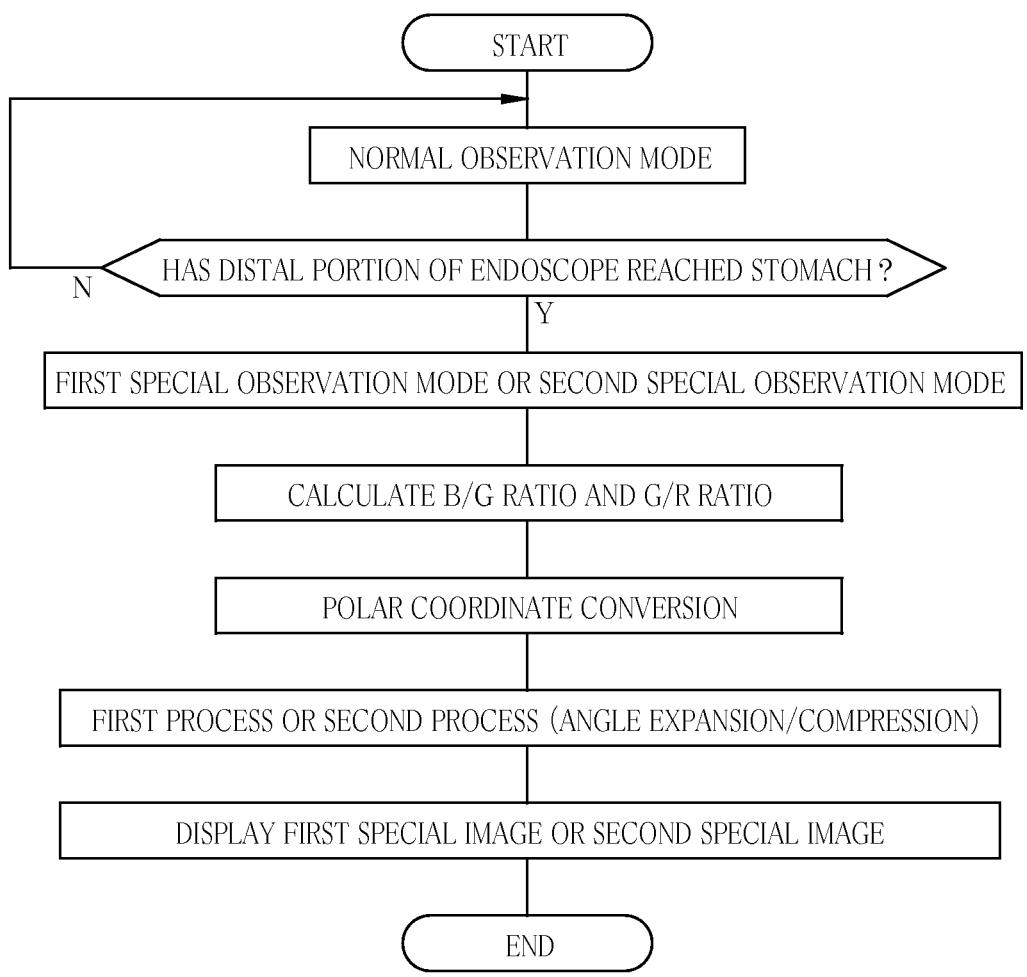
FIG. 13 is a flowchart illustrating a procedure for observing an observation target in a special observation mode.

Next, referring to a flowchart in FIG. 13, a procedure for observing an observation target in a special observation mode is described. First, the mode is set to the normal observation mode. The insertion section 12a of the endoscope 12 is inserted into the subject. After the distal portion 12d of the insertion section 12a reaches the stomach, the mode SW 13a is operated to switch from the normal observation mode to the first or second special observation mode. In order to diagnose whether the eradication of the H. pylori infection has been successful, the mode is switched to the first special observation mode. In order to diagnose whether the patient is infected with the H. pylori, the mode is switched to the second special observation mode.

The signal ratio calculator 72 calculates the B/G ratio and the G/R ratio based on the RGB image signals obtained after the mode is switched to the first or second special observation mode. Then, the calculated B/G ratio and the G/R ratio are converted into the radial coordinate r and the angular coordinate θ through the polar coordinate conversion.

Next, in the first special observation mode, the angle expansion/compression unit 74 performs the first process for the signal ratio space. In the first process, the difference between the first observation area "B" and the second observation area "C" is increased. In the first observation area "B", the radial coordinates r and the angular coordinates θ corresponding to the portion of the subject infected with the H. pylori are distributed. In the second observation area "C", the radial coordinates r and the angular coordinates θ corresponding to the portion of the subject in which the eradication of the H. pylori infection has been successful are distributed. In the second special observation mode, the angle expansion/compression unit 74 performs the second process for the signal ratio space. In the second process, the difference between the first observation area "B" and the third observation area "A" is increased. In the first observation area "B", the radial coordinates r and the angular coordinates θ corresponding to the portion of the subject infected with the H. pylori are distributed. In the third observation area "A", the radial coordinates r and the angular coordinates θ corresponding to the portion of the subject uninfected with the H. pylori are distributed. Based on the radial coordinates r and the angular coordinates θ subjected to the first or second process for the signal ratio space by the angle expansion/compression unit 74, the first special image or the second special image is produced. The produced first or second special image is displayed on the monitor 18.

Note that, in the above embodiment, the difference in hue between the first observation area "B" and the second observation area "C" is increased or the difference in hue between the first observation area "B" and the third observation area "A" is increased by expanding or compressing the angle of the coordinates in each of the observation areas in the signal ratio space as the feature space. However, instead of or in addition to this, the radial coordinate r of the coordinates in each of the observation areas may be expanded or compressed in order to increase the difference in saturation between the first observation area "B" and the second observation area "C" or increase the difference in saturation between the first observation area "B" and the third observation area "A".

Figure 14:
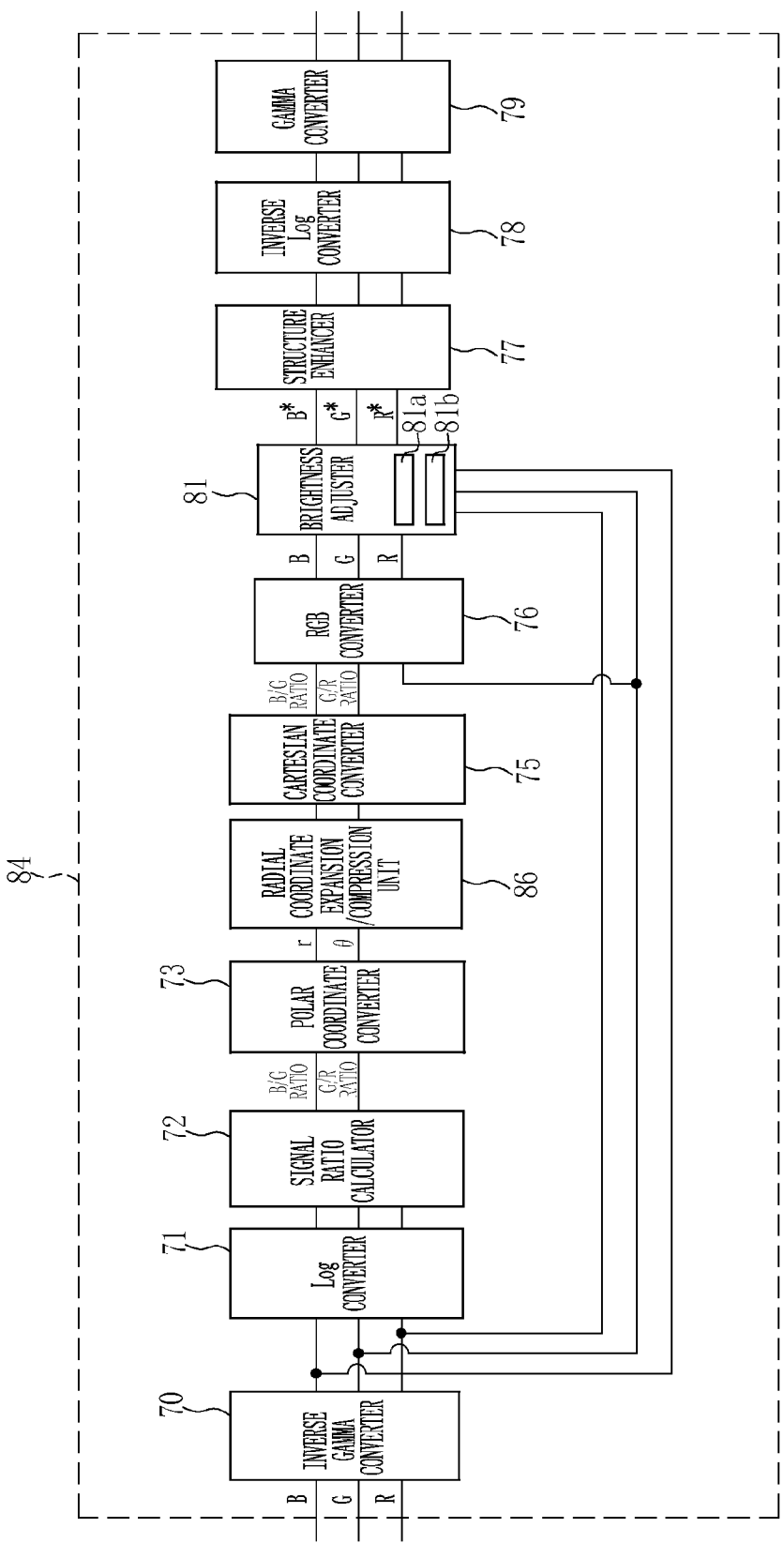
FIG. 14 is a block diagram illustrating functions of a special image processor for performing third and fourth processes.

A special image processor 84 shown in FIG. 14 performs a third process (corresponding to the "saturation enhancement process EPx" of the present invention) and a fourth process (corresponding to the "saturation enhancement process EPy" of the present invention). In the third process, the difference in saturation between the first observation area "B" and the second observation area "C" is increased by expanding or compressing the radial coordinate r. In the fourth process, the difference in saturation between the first observation area "B" and the third observation area "A" is increased by expanding or compressing the radial coordinate r. The special image processor 84 has the functions which are the same as or similar to those of the special image processor 64, except that the special image processor 84 includes a radial coordinate expansion/compression unit 86 (corresponding to saturation enhancement processing unit of the present invention) for performing the third and fourth processes in place of the angle expansion/compression unit 74.

Figure 15:
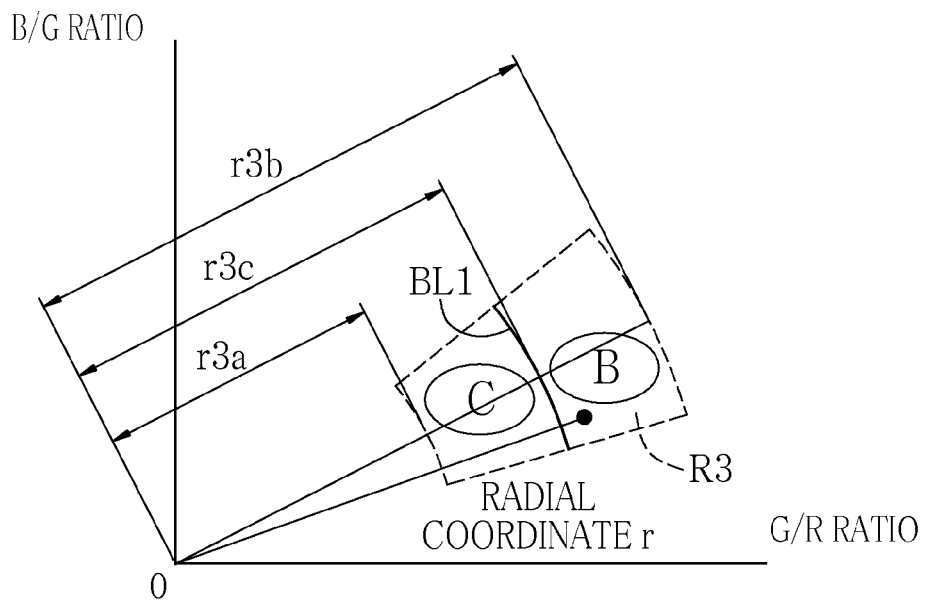
FIG. 15 is an explanatory view illustrating the third process for the signal ratio space.

The third and fourth processes performed by the radial coordinate expansion/compression unit 86 are described hereinbelow using a signal ratio space illustrated in FIG. 15. In third process for the signal ratio space, a region including the first observation area "B" and the second observation area "C" is set as a radial coordinate changing region R3 in the signal ratio space, and then the radial coordinate r of the coordinates within the radial coordinate changing region R3 is changed. In contrast, the radial coordinate r of the coordinates outside the radial coordinate changing region R3 is not changed. Further, in the third process for the signal ratio space, the angle θ of the coordinates within the radial coordinate changing region R3 is not changed.

In the radial coordinate changing region R3, the radial coordinate r is in the range of "r3a to "r3b" (i.e., r3a<r3b). A first boundary BL1 is set to a portion which is considered to be the boundary between the first observation area "B" and the second observation area "C" in the radial coordinate changing region R3. The first boundary BL1 is located on the radial coordinate r3c between the radial coordinate r3a and the radial coordinate r1b.

Figure 16:
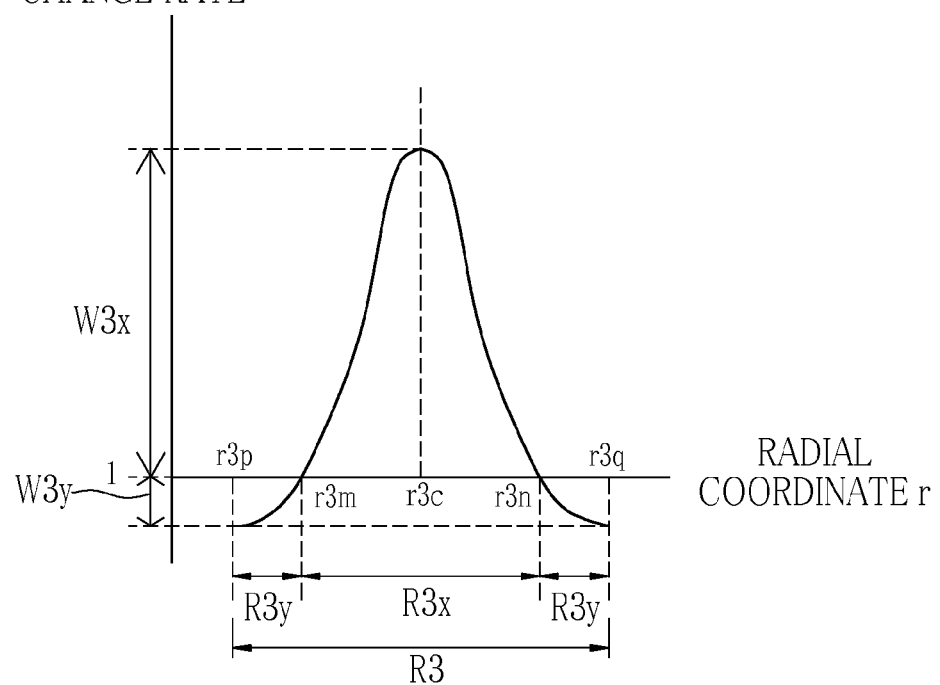
FIG. 16 is a graph illustrating a relationship between a radial coordinate r and a radial coordinate change rate at the third process for the signal ratio space.

In the third process for the signal ratio space, as illustrated in FIG. 16, a third expansion process (corresponding to "radial coordinate expansion process" of the present invention) is performed on the coordinates in a radial coordinate changing region R3x, which extends from the first boundary BL1 to a specific extent within the radial coordinate changing region R3. In the third expansion process, the radial coordinate r is changed at a radial coordinate change rate W3x of greater than "1". A third compression process (corresponding to "radial coordinate compression process" of the present invention) is performed on the coordinates in a radial coordinate changing region R3y, which is outside the radial coordinate changing region R3x. In the third compression process, the radial coordinate r is changed at a radial coordinate change rate W3y of less than "1". Note that, the radial coordinate r does not change at the radial coordinate change rate of "1". The radial coordinate changing region R3x corresponds to the "the radial coordinate changing region Rx" of the present invention, and the radial coordinate changing region R3y corresponds to the "the radial coordinate changing region Ry" of the present invention. The radial coordinate change rate W3x corresponds to the "radial coordinate change rate Wx" of the present invention, and the radial coordinate change rate W3y corresponds to the "radial coordinate change rate Wy" of the present invention.

The radial coordinate change rate W3x is set to have the highest value when the radial coordinate r is "r3c". Further, the radial coordinate change rate W3x is set to gradually decrease as the radial coordinate r decreases or increases from "r3c" in the case where the radial coordinate r is between the radial coordinate "r3c" and a radial coordinate "r3m" or a radial coordinate "r3n" ("r3m"<"r3n") which represents a boundary division between the radial coordinate changing region R3x and the radial coordinate changing region R3y. Furthermore, the radial coordinate change rate W3y is set to gradually decrease as the radial coordinate r decreases from the radial coordinate "r3m" in the case where the radial coordinate r is between the radial coordinate "r3m" and a radial coordinate "rap" which represents a minimum value of the radial coordinate changing region R3, and the radial coordinate change rate W3y is set to gradually decrease as the radial coordinate r increases from the radial coordinate "r3n" in the case where the radial coordinate r is between the radial coordinate "r3n" and a radial coordinate "r3q" which represents a maximum value of the radial coordinate changing region R3.

Figure 17:
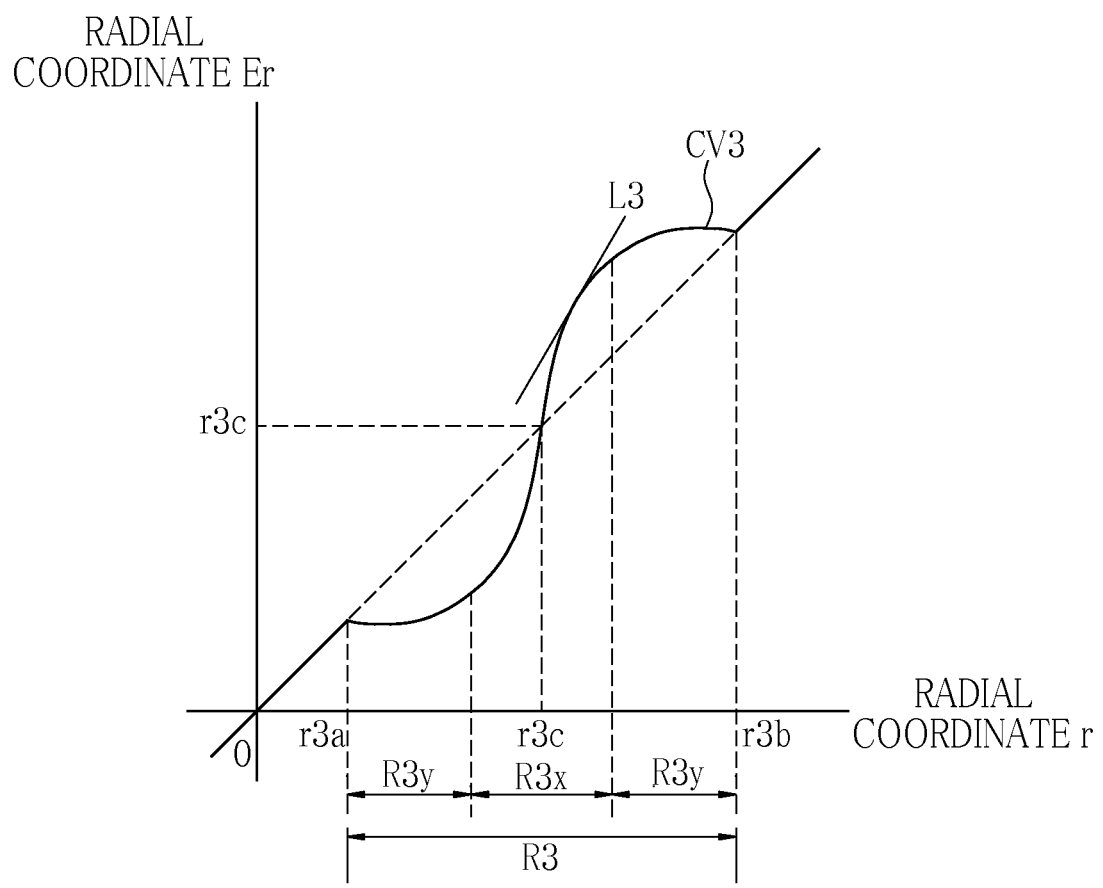
FIG. 17 is a graph illustrating a relationship between the radial coordinate r and an angle Er after the third process for the signal ratio space.

Note that, each of the radial coordinate change rates W3x and W3y is represented by the inclination of a straight line "L3", being a tangent line of a curve CV3. The curve CV3 depicts the relationship between the radial coordinate r and a radial coordinate Er (see FIG. 17). The inclination of the straight line L3 is greater than "1" in the radial coordinate changing region R3x. On the other hand, the inclination of the straight line L3 is less than "1" in the radial coordinate changing region R3y. The inclination of the straight line L3 outside the radial coordinate changing region R3 is "1".

By performing the third process for the signal ratio space, which is composed of the third expansion process and the third compression process as described above, as illustrated in FIG. 17, the radial coordinate r that is smaller than the radial coordinate r3c is changed to the radial coordinate Er that is further smaller, and the radial coordinate r that is larger than the radial coordinate r3c is changed to the radial coordinate Er that is further larger. The radial coordinate r3c does not change before and after the third process. The radial coordinate r outside the radial coordinate changing region R3 is changed to the radial coordinate Er that is equivalent to the radial coordinate r (identical transformation).

Figure 18A:
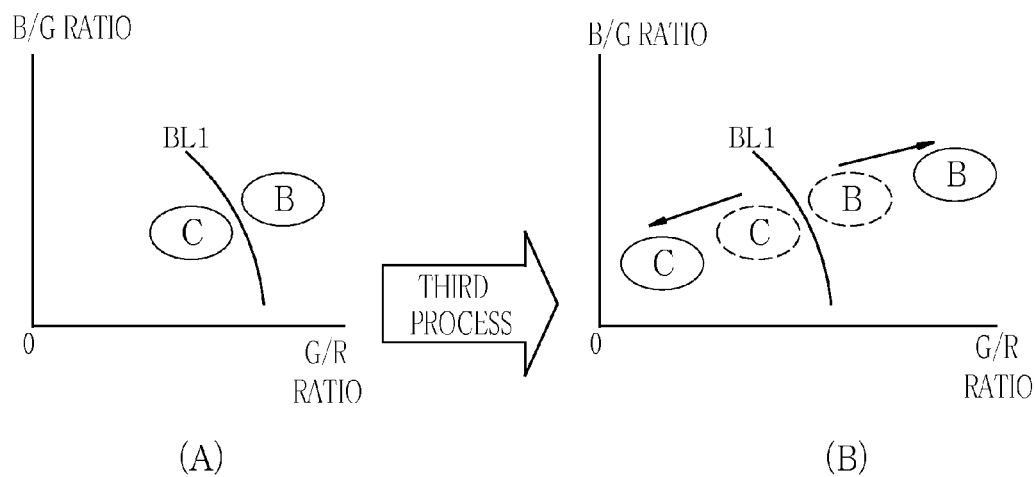
FIG. 18A is an explanatory view illustrating an operation and effects of the third process for the signal ratio space.

The following operation and the effects are obtained by changing the radial coordinate as described above. Before the third process for the signal ratio space, as illustrated in a graph (A) in FIG. 18A, the first observation area "B" and the second observation area "C" are close to each other. After the third process for the signal ratio space, as illustrated in a graph (B) in FIG. 18A, most of the coordinates corresponding to the first observation area "B" move away from an origin while most of the coordinates corresponding to the second observation area "C" move closer to the origin.

From the viewpoint that the saturation is decreased as the coordinate moves closer to the origin in a direction of the radial coordinate r in the signal ratio space while the saturation is increased as the coordinate moves away from the origin, it is possible to increase the difference in saturation between the first observation area "B" and the second observation area "C" by performing the third process for the signal ratio space. In the first special image obtained by increasing the difference in saturation between the first observation area "B" and the second observation area "C" as described above, the observation target infected with the *H. pylori* is displayed with high saturation while the observation target in which the eradication of the *H. pylori* infection has been successful is displayed with low saturation.

Thereby, whether the eradication of the *H. pylori* infection has been successful is diagnosed reliably.

Additionally, in the third process for the signal ratio space, in addition to the third expansion process, the third compression process is performed, such that each of the saturation of the observation target infected with the *H. pylori* and the saturation of the observation target in which the eradication of the *H. pylori* infection has been successful is within a specific range.

Figure 18B:
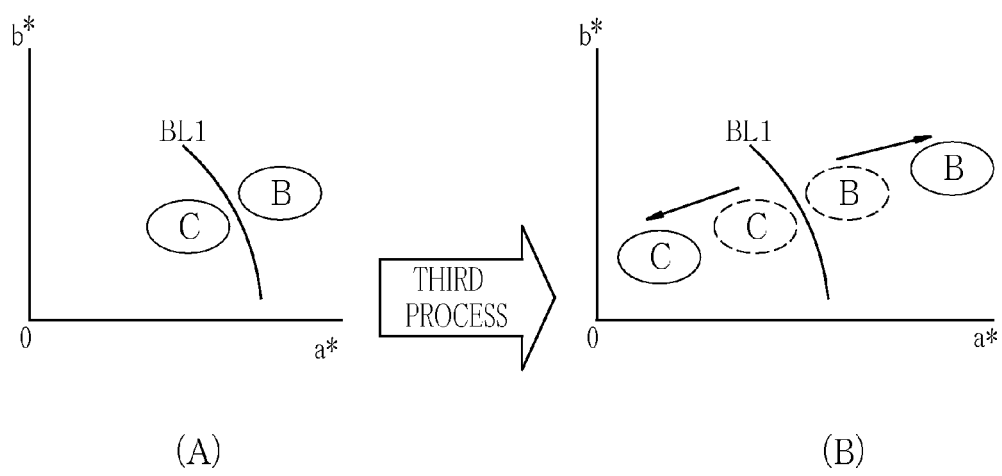
FIG. 18B is an explanatory view illustrating an operation and effects of the third process in the case where the feature space is the ab space.

Note that, in the case of the feature space (the ab space) formed by the color components a* and b* which are obtained by the Lab conversion of the first RGB image signals performed by the Lab converter (i.e., color components a* and b*, being the two or more pieces of color information, in a CIE Lab space, the same applies hereafter), as illustrated in FIG. 18B, most of the coordinates corresponding to the first observation area "B" move away from the origin while most of the coordinates corresponding to the second observation area "C" move closer to the origin by the third process for the ab space. Here, in FIG. 18B, a graph (A) depicts the distribution of the first and second observation areas (B) and (C) before the third process for the ab space, and a graph (B) depicts the distribution of the first and second observation areas (B) and (C) after the third process for the ab space.

Figure 19:
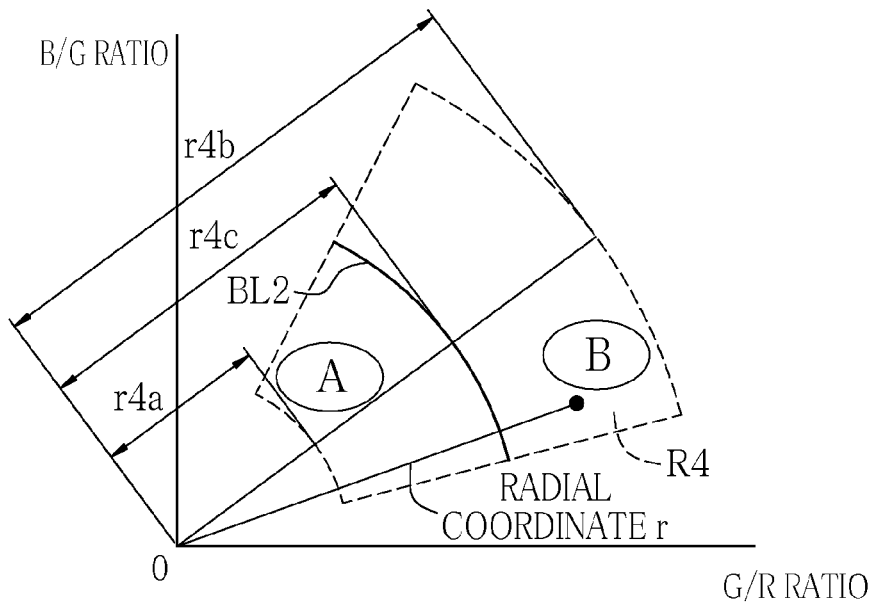
FIG. 19 is an explanatory view illustrating the fourth process for the signal ratio space.

In fourth process for the signal ratio space, a region including the first observation area "B" and the third observation area "A" is set as a radial coordinate changing region R4 in the signal ratio space, as illustrated in FIG. 19, and then the radial coordinate r of the coordinates within the radial coordinate changing region R4 is changed. In contrast, the radial coordinate r of the coordinates outside the radial coordinate changing region R4 is not changed. Further, in the fourth process for the signal ratio space, the angle θ of the coordinates within the radial coordinate changing region R4 is not changed.

In the radial coordinate changing region R4, the radial coordinate r is in the range of "r4a to rob" (i.e., r4a<r4b). A second boundary BL2 is set to a portion which is considered to be the boundary between the first observation area "B" and the third observation area "A" in the radial coordinate changing region R4. The second boundary BL2 is located on a radial coordinate r4c between the radial coordinate r4a and the radial coordinate rob. The radial coordinate r4c is smaller than the radial coordinate r3c denoted by the first boundary BL1.

Figure 20:
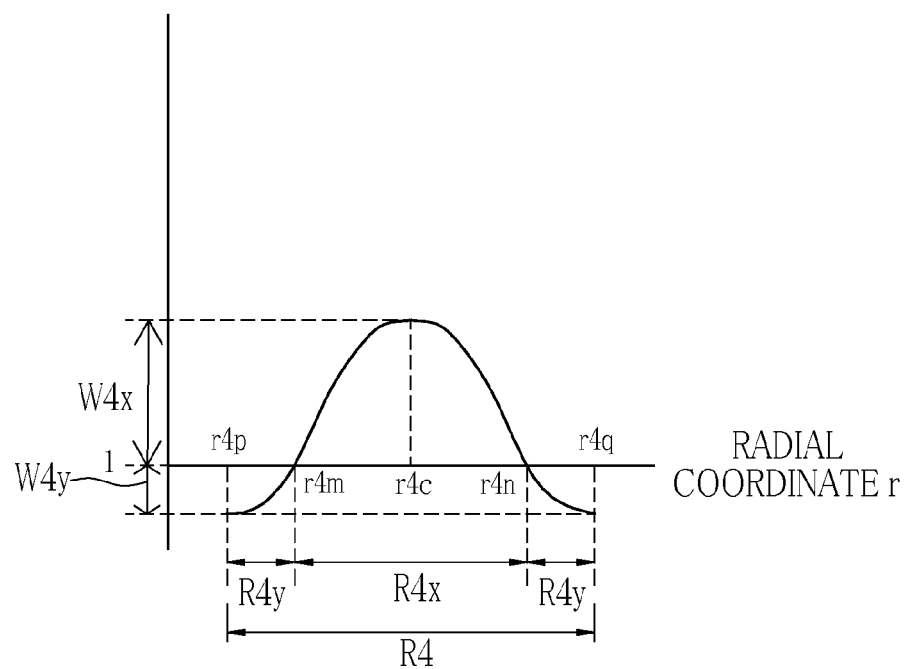
FIG. 20 is a graph illustrating a relationship between the radial coordinate r and a radial coordinate change rate at the fourth process for the signal ratio space.

In the fourth process for the signal ratio space, as illustrated in FIG. 20, a fourth expansion process is performed on the coordinates in a radial coordinate changing region R4x, which extends from the second boundary BL2 to a specific extent within the radial coordinate changing region R4. In the fourth expansion process, the radial coordinate r is changed at a radial coordinate change rate W4x of greater than "1". A fourth compression process is performed on the coordinates in a radial coordinate changing region R4y, which is outside the radial coordinate changing region R4x. In the fourth compression process, the radial coordinate r is changed at a radial coordinate change rate W4y of less than "1". Note that, the radial coordinate r does not change at the radial coordinate change rate of "1".

The radial coordinate change rate W4x is set to have the highest value when the radial coordinate r is "r4c". The radial coordinate change rate W4x when the radial coordinate r is "r4c" is set to be less than the radial coordinate change rate W3x when the radial coordinate r is "r3c". Further, the radial coordinate change rate W4x is set to gradually decrease as the radial coordinate r decreases or increases from "r4c" in the case where the radial coordinate r is between the radial coordinate "r4c" and a radial coordinate "r4m" or a radial coordinate "r4n" ("r4m" <"r4n") which represents a boundary division between the radial coordinate changing region R4x and the radial coordinate changing region R4y. Furthermore, the radial coordinate change rate W4y is set to gradually decrease as the radial coordinate r decreases from the radial coordinate "r4m" in the case where the radial coordinate r is between the radial coordinate "r4m" and a radial coordinate "r4p" which represents a minimum value of the radial coordinate changing region R4, and the radial coordinate change rate W4y is set to gradually decrease as the radial coordinate r increases from the radial coordinate "r4n" in the case where the radial coordinate r is between the radial coordinate "r4n" and a radial coordinate "r4q" which represents a maximum value of the radial coordinate changing region R4.

Figure 21:
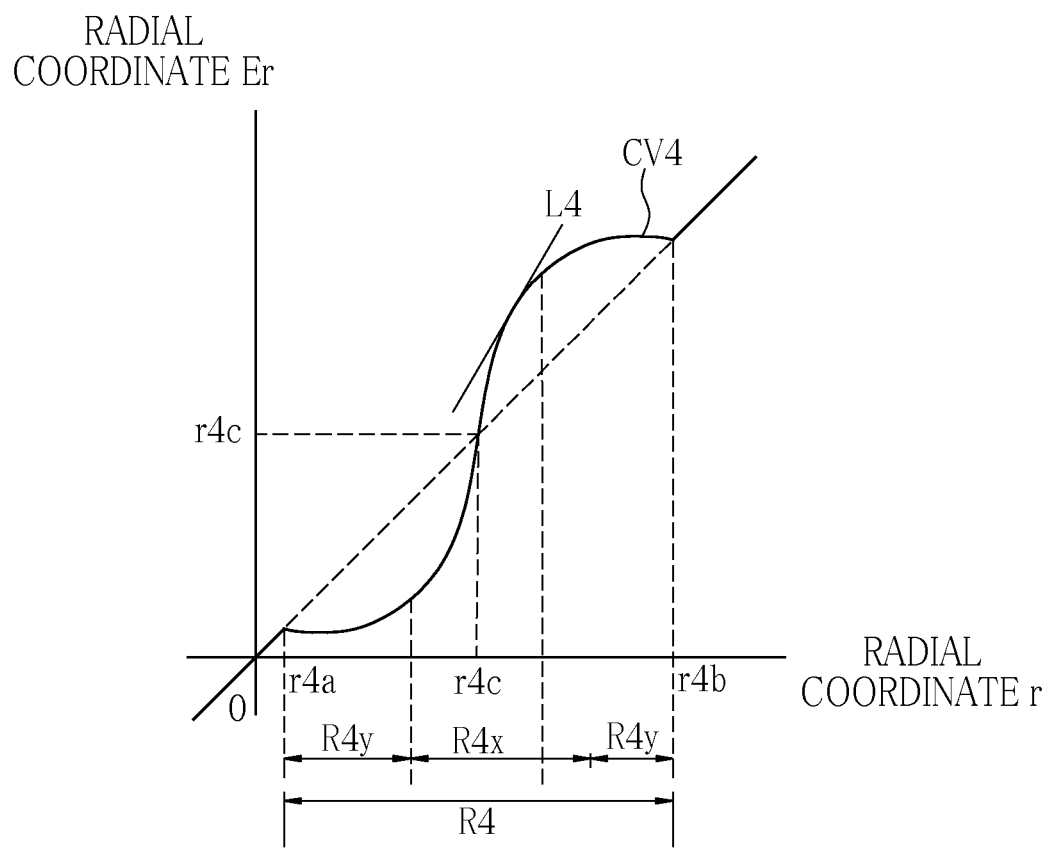
FIG. 21 is a graph illustrating a relationship between the radial coordinate r and the angle Er after the fourth process for the signal ratio space.

Note that, each of the radial coordinate change rates W4x and W4y is represented by the inclination of a straight line "L4", being a tangent line of a curve CV4. The curve CV4 depicts the relationship between the radial coordinate r and a radial coordinate Er (see FIG. 21). The inclination of the straight line L4 is greater than "1" in the radial coordinate changing region R4x. On the other hand, the inclination of the straight line L4 is less than "1" in the radial coordinate changing region R4y. The inclination of the straight line L4 outside the radial coordinate changing region R4 is "1".

By performing the fourth process for the signal ratio space, which is composed of the fourth expansion process and the fourth compression process as described above, as illustrated in FIG. 21, the radial coordinate r that is smaller than the radial coordinate r4c is changed to the radial coordinate Er that is further smaller. In contrast, the radial coordinate r that is larger than the radial coordinate r4c is changed to the radial coordinate Er that is further larger. The radial coordinate r4c does not change before and after the fourth process. The radial coordinate r outside the radial coordinate changing region R4 is changed to the radial coordinate Er that is equivalent to the radial coordinate r (identical transformation).

Figure 22A:
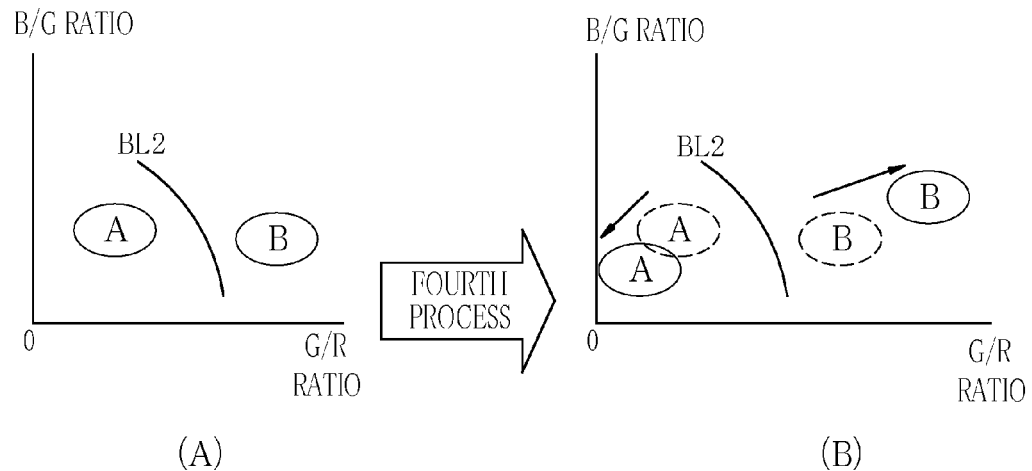
FIG. 22A is an explanatory view illustrating an operation and effects of the fourth process for the signal ratio space.

The following operation and the effects are obtained by changing the radial coordinate as described above. Before the fourth process for the signal ratio space, as illustrated in a graph (A) in FIG. 22A, the first observation area "B" and the third observation area "A" are separated from each other to some extent. After the fourth process for the signal ratio space, as illustrated in a graph (B) in FIG. 22A, most of the coordinates corresponding to the first observation area "B" move away from the origin while most of the coordinates corresponding to the third observation area "A" move closer to the origin. Thereby, the first observation area "B" and the third observation area "A" are further separated from each other.

Since the first observation area "B" and the third observation area "A" are further separated from each other in the signal ratio space as described above, the difference in saturation between the first observation area "B" and the third observation area "A" is further increased. In the second special image obtained by increasing the difference in saturation between the first observation area "B" and the third observation area "A" as described above, the observation target infected with the *H. pylori* is displayed with high saturation while the observation target uninfected with the *H. pylori* is displayed with low saturation. Thereby, whether the observation target is infected or uninfected with the *H. pylori* is diagnosed reliably.

Additionally, in the fourth process for the signal ratio space, in addition to the fourth expansion process, the fourth compression process is performed, such that each of the saturation of the observation target infected with the *H. pylori* and the saturation of the observation target uninfected with the *H. pylori* infection is within a specific range.

Figure 22B:
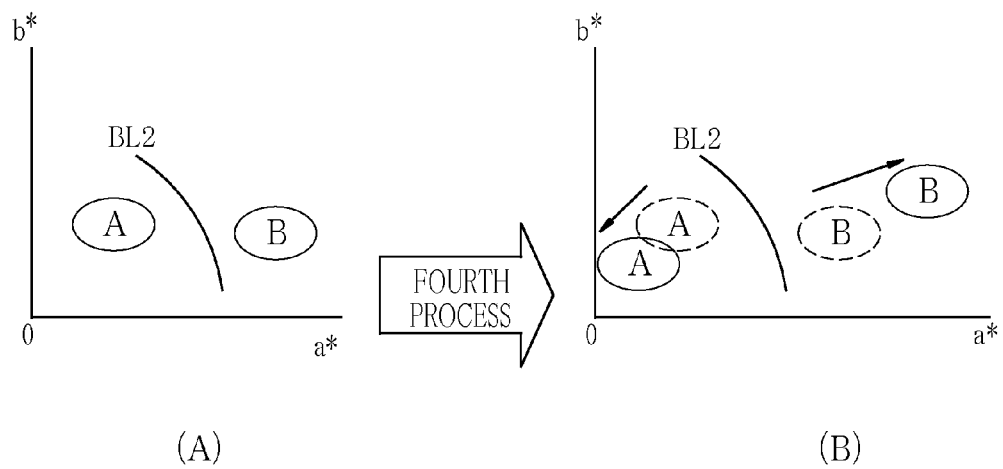
FIG. 22B is an explanatory view illustrating an operation and effects of the fourth process in the case where the feature space is the ab space.

Note that, in the case of the feature space (the ab space) formed by the color components a* and b* which are obtained by the Lab conversion of the first RGB image signals performed by the Lab converter (i.e., color components a* and b*, being the two or more pieces of color information, in a CIE Lab space, the same applies hereafter), as illustrated in FIG. 22B, most of the coordinates corresponding to the first observation area "B" move away from the origin while most of the coordinates corresponding to the third observation area "A" move closer to the origin by the fourth process for the ab space. Here, in FIG. 22B, a graph (A) depicts the distribution of the first and third observation areas "B" and "A" before the fourth process for the ab space and a graph (B) depicts the distribution of the first and third observation areas "B" and "A" after the fourth process for the ab space.

Note that, the signal ratio calculator 72 calculates the B/G ratio and the G/R ratio based on the first RGB image signals in the above embodiment, and the first to fourth processes are performed in the feature space formed by the B/G ratio and the G/R ratio in the above embodiment. Alternatively, color information which differs from the B/G ratio and the G/R ratio may be obtained, and the first to fourth processes may be performed in a feature space formed by the different color information.

Figure 23:
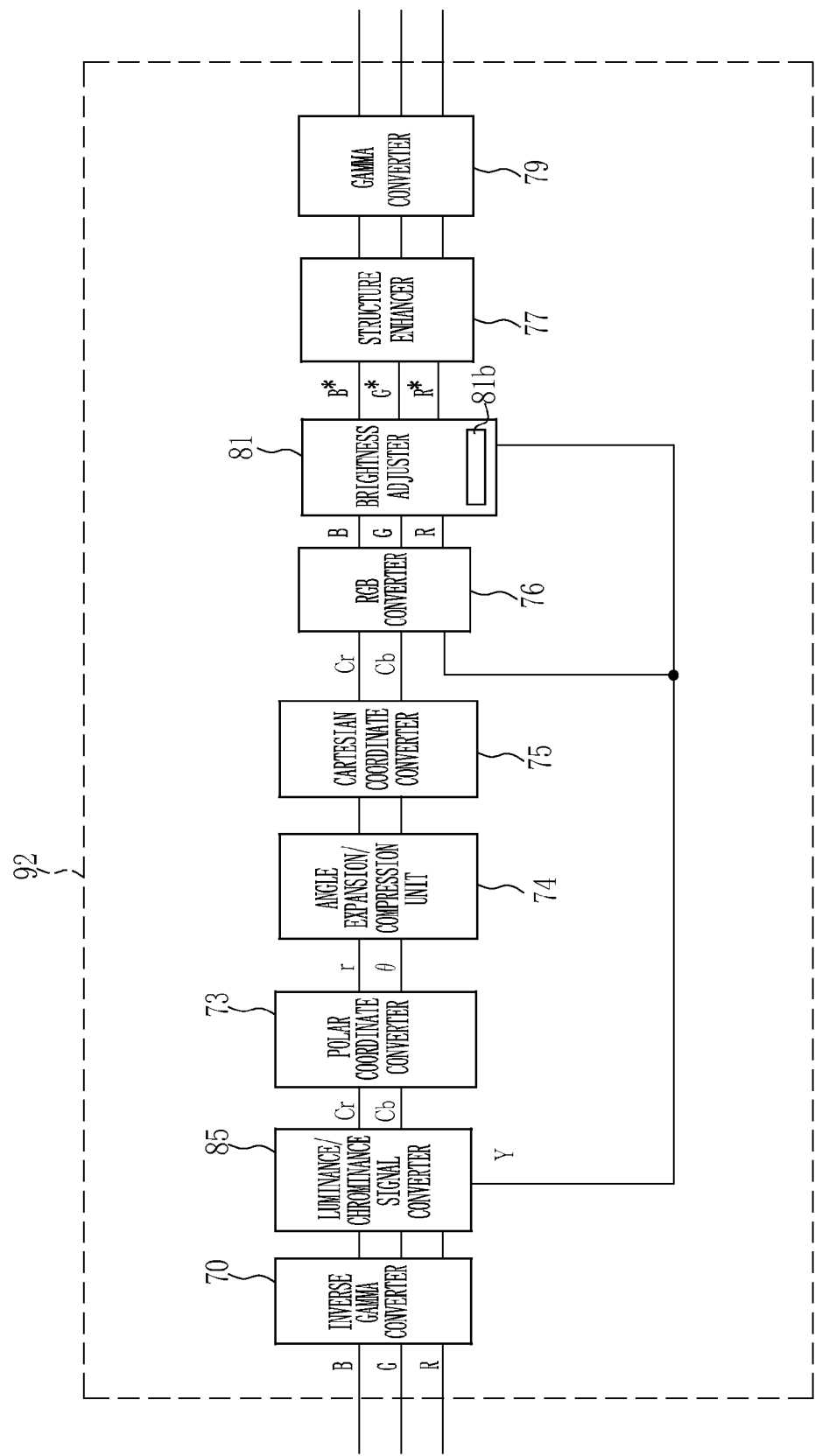
FIG. 23 is a block diagram illustrating functions of a special image processor for performing third and fourth processes in the case where the feature space is a CbCr space.

For example, chrominance signals Cr and Cb may be obtained as the color information, and the first to fourth processes may be performed in a feature space formed by the chrominance signals Cr and Cb. In the case where the special image is produced by using the chrominance signals Cr and Cb in the first and second processes, a special image processor 92 illustrated in FIG. 23 is used. Unlike the special image processor 64, the special image processor 92 is not provided with the log converter 71, the signal ratio calculator 72, and the inverse log converter 78. Instead, the special image processor 92 includes a luminance/chrominance signal converter 85 disposed between the inverse gamma converter 70 and the polar coordinate converter 73. The components, other than those described above, of the special image processor 92 are the same as or similar to the components of the special image processor 64.

The luminance/chrominance signal converter 85, which corresponds to the "color information obtaining section" of the present invention, converts the first RGB image signals into the luminance signal Y and the chrominance signals Cr and Cb. A well-known conversion equation is used for the conversion into the chrominance signals Cr and Cb. The chrominance signals Cr and Cb are transmitted to the polar coordinate converter 73. The luminance signal Y is transmitted to the RGB converter 76 and the brightness adjuster 81. The RGB converter 76 converts the chrominance signals Cr and Cb, which have passed through the Cartesian coordinate converter 75, and the luminance signal Y into the second RGB image signals. The brightness adjuster 81 adjusts the pixel values of the second RGB image signals with the use of the luminance signal Y (the first brightness information Yin) and the second brightness information (the second brightness information Yout) which is calculated by the second brightness information calculator 81b. Note that, the method for calculating the second brightness information Yout and the method for adjusting the pixel values of the second RGB image signals are the same as or similar to those of the special image processor 64 described above.

Figure 24:
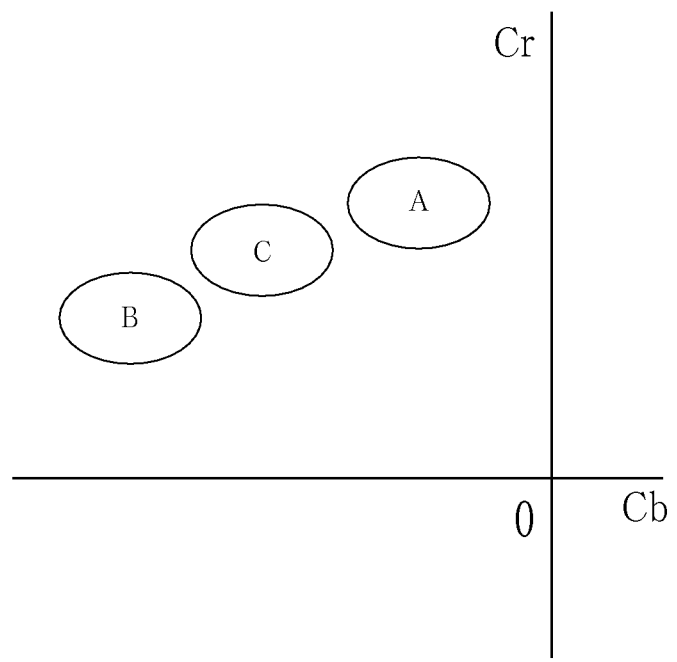
FIG. 24 is an explanatory view illustrating distribution of coordinates corresponding to a portion uninfected with *Helicobacter pylori* (*H. pylori*) (third observation area "A"), distribution of coordinates corresponding to a portion infected with the *H. pylori* (first observation area "B"), and distribution of coordinates corresponding to a portion in which the *H. pylori* infection has been successfully eradicated (second observation area "C"), in the feature space (the CbCr space)

The special image processor 92 performs the first process or the second process for the Cb-Cr space in the feature space (hereinafter referred to as the Cb-Cr space; the vertical axis: the chrominance signal Cr, the horizontal axis: the chrominance signal Cb). As illustrated in FIG. 24, all the first observation area "B", the second observation area "C", and the third observation area "A" are distributed in the second quadrant of the Cb-Cr space. The third observation area "A" is closest to the vertical axis Cr. The second observation area "C" is second closest to the vertical axis Cr. The first observation area "B" is farthest from the vertical axis Cr.

Figure 25:
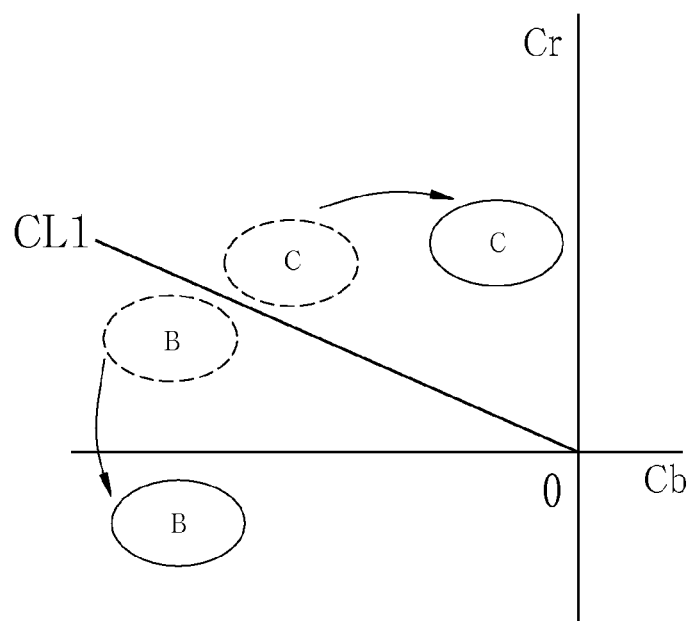
FIG. 25 is an explanatory view illustrating the first process in the case where the feature space is the CbCr space.

In the first process for the Cb-Cr space, as illustrated in FIG. 25, the angle expansion/compression unit 74 expands or compresses the angle of the coordinates in the first observation area "B", which is located on one of the sides of the first center line CL1, in the counterclockwise direction. The angle expansion/compression unit 74 expands or compresses the angle of the coordinates in the second observation area "C", which is located on the other side of the first center line CL1, in the clockwise direction. Thus, the difference in saturation between the first observation area "B" and the second observation area "C" is increased. The methods for expanding or compressing the angles in the first and second observation areas "B" and "C" in the Cb-Cr space are the same as or similar to those in the signal ratio space (see FIGS. 5 to 8A). Note that, in FIG. 25, the areas with dotted lines illustrate the areas before the first process for the Cb-Cr space. The areas with solid lines illustrate the areas after the first process for the Cb-Cr space. This also applies to the drawings described below.

Figure 26:
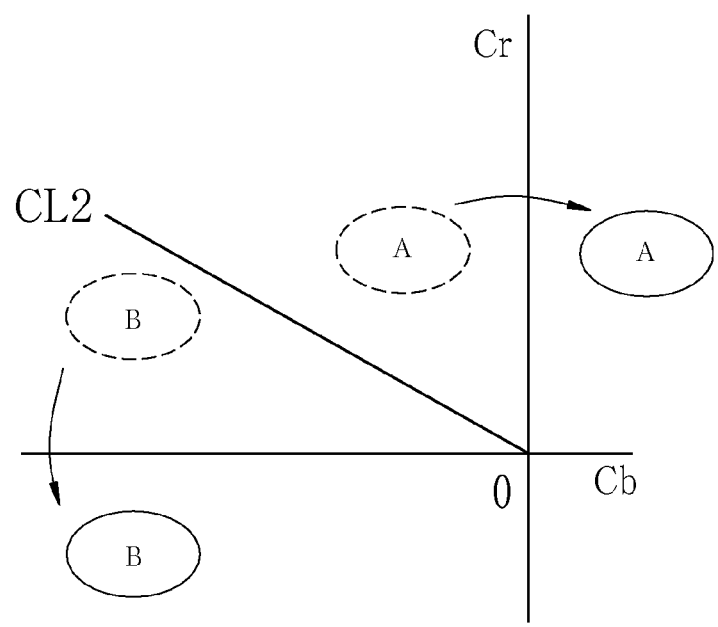
FIG. 26 is an explanatory view illustrating the second process in the case where the feature space is the CbCr space.

In the second process for the Cb-Cr space, as illustrated in FIG. 26, the angle expansion/compression unit 74 expands or compresses the angle of the coordinates in the first observation area "B", which is located on one of the sides of the second center line CL2, in the counterclockwise direction. The angle expansion/compression unit 74 expands or compresses the angle of the coordinates in the third observation area "A", which is located on the other side of the second center line CL2, in the clockwise direction. Thus, the difference in saturation between the first observation area "B" and the third observation area "A" is increased. The methods for expanding or compressing the angles in the first and third observation areas "B" and "A" in the Cb-Cr space are the same as or similar to those in the signal ratio space (see FIGS. 9, 10, 11, and 12A).

Figure 27:
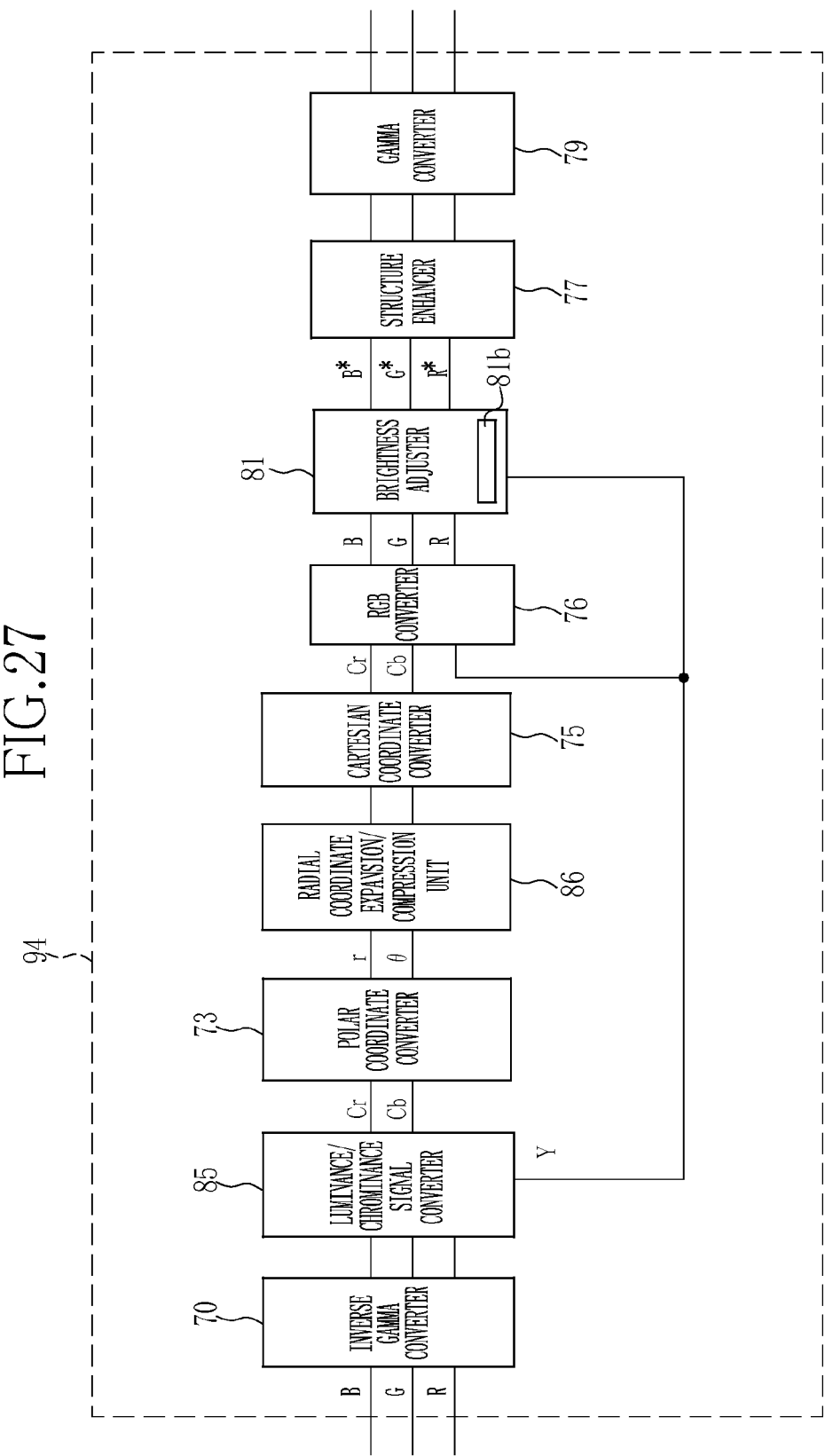
FIG. 27 is a block diagram illustrating functions of the special image processor for performing the third and fourth processes in the case where the feature space is the CbCr space.

In the case where the special image is produced by using the chrominance signals Cr and Cb in the third and fourth processes, a special image processor 94 illustrated in FIG. 27 is used. The special image processor 94 includes the radial coordinate expansion/compression unit 86 in place of the angle expansion/compression unit 74. The components, other than those described above, of the special image processor 94 are the same as or similar to the components of the special image processor 92.

Figure 28:
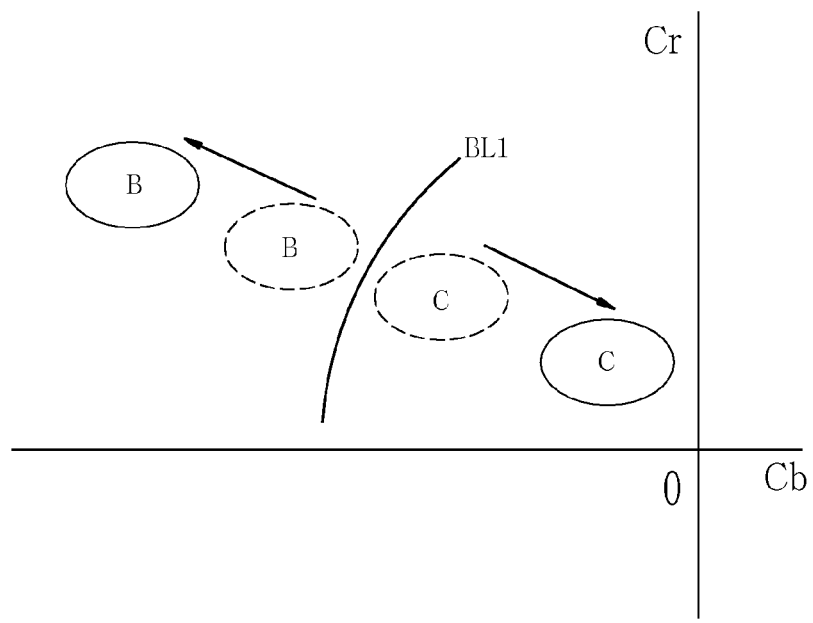
FIG. 28 is an explanatory view illustrating the third process in the case where the feature space is the CbCr space.

The special image processor 94 performs the third process or the fourth process for the Cb-Cr space in the Cb-Cr space. In the third process for the Cb-Cr space, as illustrated in FIG. 28, the radial coordinate expansion/compression unit 86 expands or compresses the radial coordinate r of the coordinates in the first observation area "B", which is located on one of the sides of the border line BL1, in a direction moving away from the origin. The radial coordinate expansion/compression unit 86 expands or compresses the radial coordinate r of the coordinates in the second observation area "C", which is located on the other side of the first border line BL1, in a direction moving closer to the origin. Thus, the difference in saturation between the first observation area "B" and the second observation area "C" is increased. The methods for expanding or compressing the radial coordinate r in the first and second observation areas "B" and "C" in the Cb-Cr space are the same as or similar to those in the signal ratio space (see FIGS. 15 to 17, and 18A).

Figure 29:
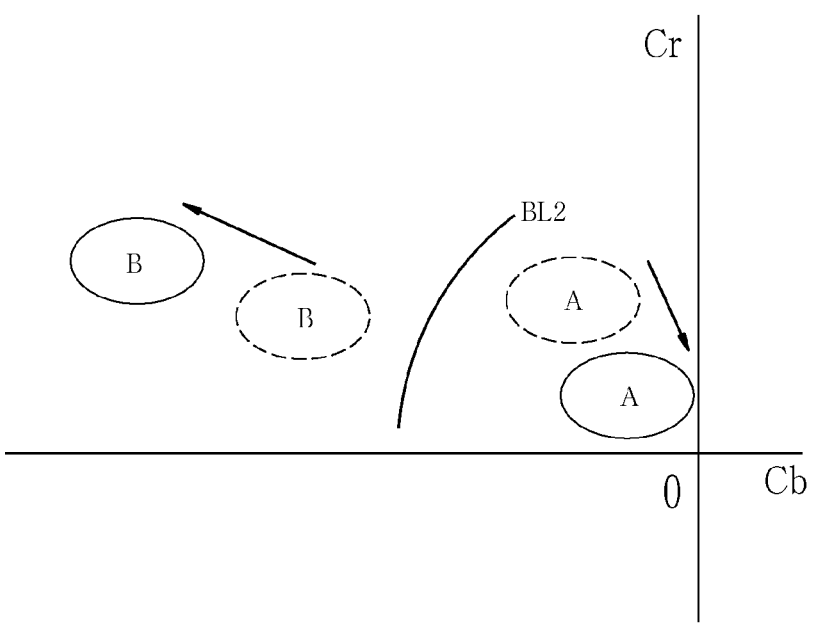
FIG. 29 is an explanatory view illustrating the fourth process in the case where the feature space is the CbCr space.

In the fourth process for the Cb-Cr space, as illustrated in FIG. 29, the radial coordinate expansion/compression unit 86 expands or compresses the radial coordinate r of the coordinates in the first observation area "B", which is located on one of the sides of the second border line CL2, in the direction moving away from the origin. The radial coordinate expansion/compression unit 86 expands or compresses the radial coordinate r of the coordinates in the third observation area "A", which is located on the other side of the second border line CL2, in the direction moving closer to the origin. Thus, the difference in saturation between the first observation area "B" and the third observation area "A" is increased. The methods for expanding or compressing the radial coordinate r in the first and third observation areas "B" and "A" in the Cb-Cr space are the same as or similar to those in the signal ratio space (see FIGS. 19 to 21, and 22A).

Figure 30:
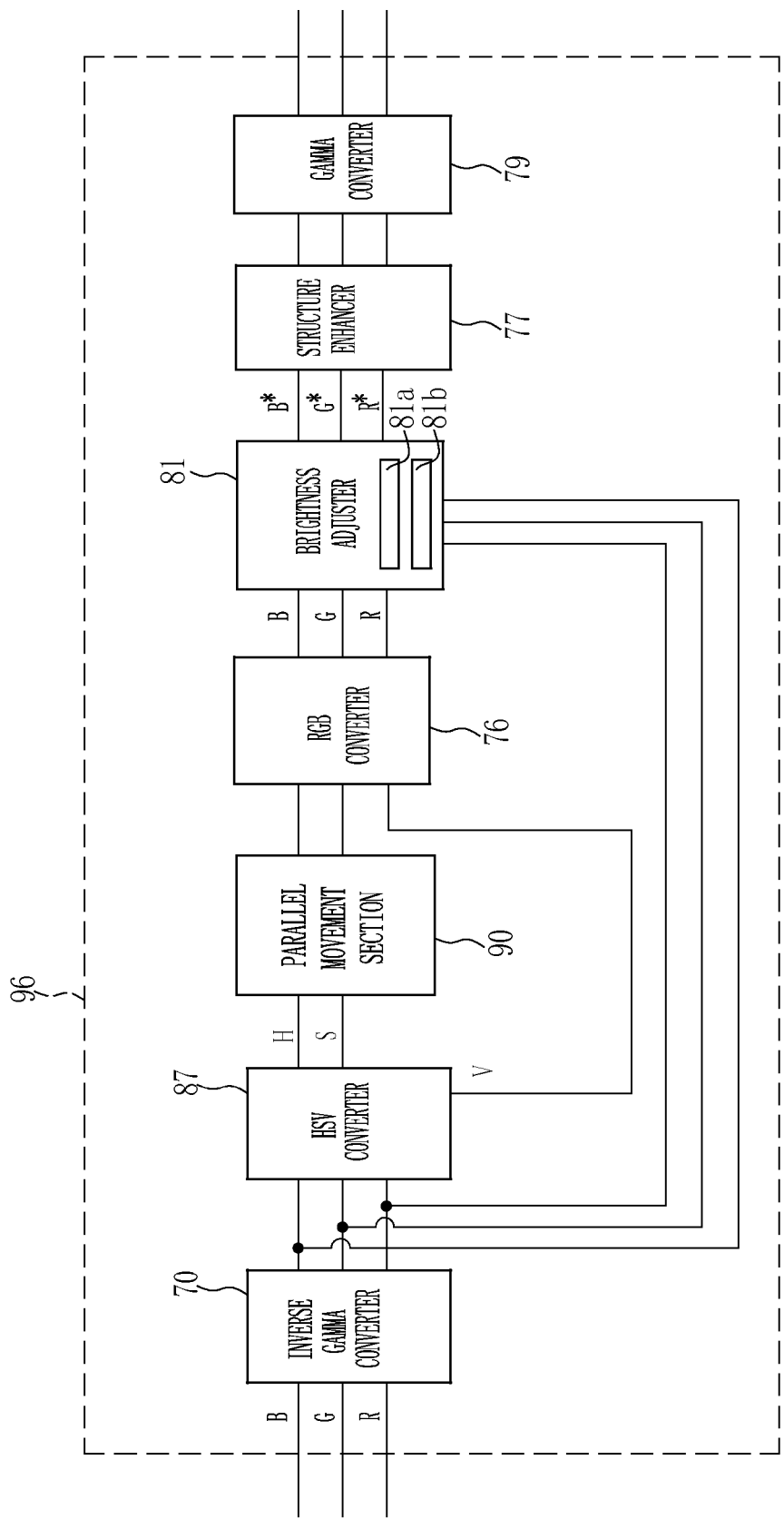
FIG. 30 is a block diagram illustrating functions of the special image processor in the case where the feature space is an HS space.

Additionally, hue H and saturation S may be obtained and used as the color information. The first to fourth processes may be performed in the feature space formed by the hue H and the saturation S. In the case where the hue H and the saturation S are used to produce the special image, a special image processor 96 illustrated in FIG. 30 is used. Unlike the special image processor 64, the special image processor 96 is not provided with the log converter 71, the signal ratio calculator 72, the polar coordinate converter 73, the angle expansion/compression unit 74, the Cartesian coordinate converter 75, and the inverse log converter 78. Instead, the special image processor 96 includes an HSV converter 87 and a parallel movement section 90 disposed between the inverse gamma converter 70 and the RGB converter 76. The components, other than those described above, of the special image processor 96 are the same as or similar to the components of the special image processor 64.

The HSV converter 87, which corresponds to the "color information obtaining section" of the present invention, converts the first RGB image signals into hue H, saturation S, and value V. A well-known conversion equation is used for the conversion into the hue H, the saturation S, and the value V. The hue H and the saturation S are transmitted to the parallel movement section 90. The value V is transmitted to the RGB converter 76. The RGB converter 76 converts the hue H and the saturation S, which have passed through the parallel movement section 90, and the value V into the second RGB image signals. The brightness adjuster 81 adjusts the pixel values of the second RGB image signals with the use of the first brightness information Yin calculated by the first brightness information calculator 81a and the second brightness information Yout calculated by the second brightness information calculator 81b. Note that, the methods for calculating the first brightness information Yin and the second brightness information Yout and the method for adjusting the pixel values of the second RGB image signals are the same as or similar to those of the special image processor 64.

Figure 31:
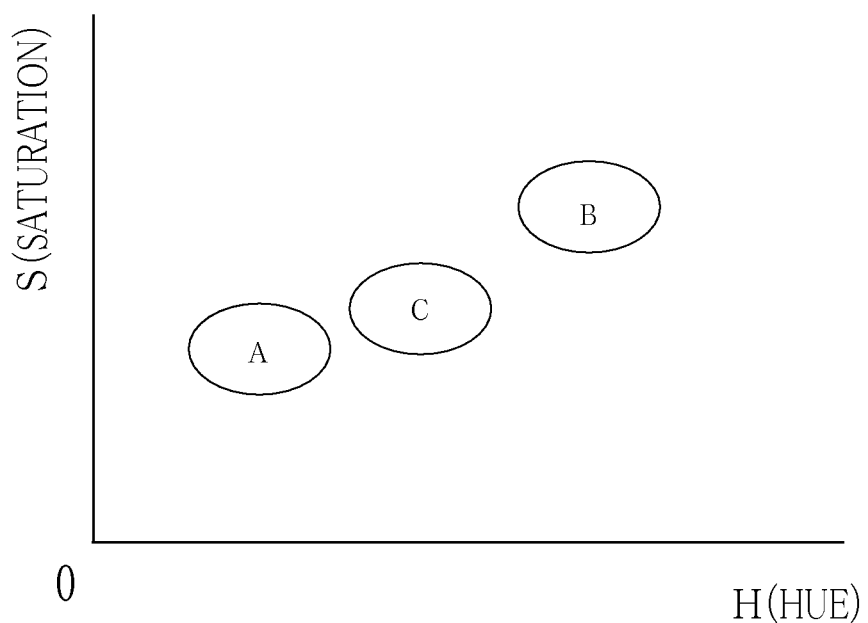
FIG. 31 is an explanatory view illustrating distribution of coordinates corresponding to a portion uninfected with *Helicobacter pylori* (*H. pylori*) (third observation area "A"), distribution of coordinates corresponding to a portion infected with the *H. pylori* (first observation area "B"), and distribution of coordinates corresponding to a portion in which the *H. pylori* infection has been successfully eradicated (second observation area "C"), in the feature space (the HS space)

The special image processor 96 performs the first process or the second process for HS space in the feature space (hereinafter referred to as the HS space; the vertical axis: the saturation S, the horizontal axis: the hue H). As illustrated in FIG. 31, the positions (or distribution) of the first observation area "B", the second observation area "C", and the third observation area "A" in the HS space slightly differ from those in the signal ratio space (the vertical axis: the B/G ratio, the horizontal axis: the G/R ratio). The difference in saturation is increased in order of the third observation area "A", the second observation area "C", and the first observation area "B".

Figure 32:
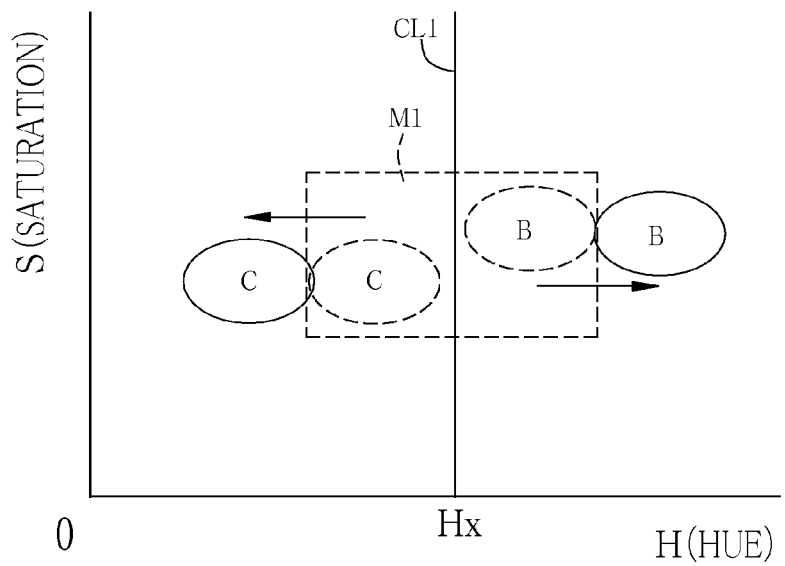
FIG. 32 is an explanatory view illustrating the first process in the case where the feature space is the HS space.

As illustrated in FIG. 32, in the first process for the HS space, the parallel movement section 90 translates or moves the coordinates in the first observation area "B", which is located on one of the sides of the first center line CL1, laterally or parallel to themselves to the right in the hue direction. The parallel movement section 90 translates or moves the coordinates in the second observation area "C", which is located on the other side of the first center line CL1, laterally or parallel to themselves to the left in the hue direction. Thus, the difference in hue between the coordinates corresponding to the first observation area "B" and the coordinates corresponding to the second observation area "C" is increased. Incidentally, the first centerline CL1 is provided to a portion, between the first observation area "B" and the second observation area "C" in the HS space, in which the hue H takes a value Hx (a constant). It is preferred that the parallel movement section 90 translates or moves the coordinates in a first movement area M1, which includes the first observation area "B" and the second observation area "C", laterally or parallel.

Figure 33:
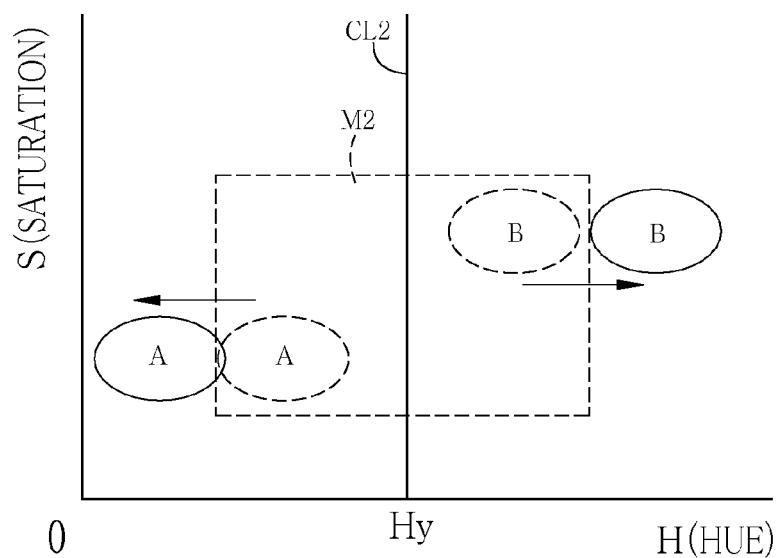
FIG. 33 is an explanatory view illustrating the second process in the case where the feature space is the HS space.

As illustrated in FIG. 33, in the second process for the HS space, the parallel movement section 90 translates or moves the coordinates in the first observation area "B", which is located on one of the sides of the second center line CL2, laterally or parallel to themselves to the right in the hue direction. The parallel movement section 90 translates or moves the coordinates in the third observation area "A", which is located on the other side of the second center line CL2, laterally or parallel to themselves to the left in the hue direction. Thus, the difference in hue between the coordinates corresponding to the first observation area "B" and the coordinates corresponding to the third observation area "A" is increased. Incidentally, the second center line CL2 is provided to a portion, between the first observation area "B" and the third observation area "A" in the HS space, in which the hue H takes a value Hy (a constant) that is different from the value Hx of the first center line CL1. It is preferred that the parallel movement section 90 translates or moves the coordinates in a second movement area M2, which includes the first observation area "B" and the third observation area "A", laterally or parallel. The second movement area M2 is greater in size than the first movement area M1.

Figure 34:
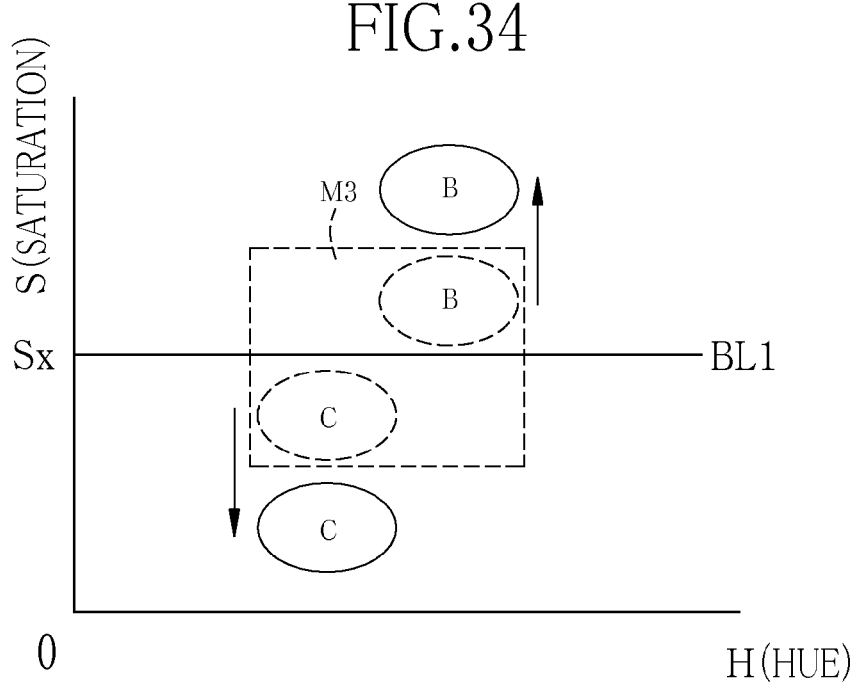
FIG. 34 is an explanatory view illustrating the third process in the case where the feature space is the HS space.

As illustrated in FIG. 34, in the third process for the HS space, the parallel movement section 90 translates or moves the coordinates in the first observation area "B", which is located on one of the sides of the first boundary BL1, vertically or parallel to themselves to the upward in the saturation direction. The parallel movement section 90 translates or moves the coordinates in the second observation area "C", which is located on the other side of the first boundary BL1, vertically or parallel to themselves to the downward in the saturation direction. Thus, the difference in saturation between the coordinates corresponding to the first observation area "B" and the coordinates corresponding to the second observation area "C" is increased. Incidentally, the first boundary BL1 is provided to a portion, between the first observation area "B" and the second observation area "C" in the HS space, in which the saturation S takes a value Sx (a constant). It is preferred that the parallel movement section 90 translates or moves the coordinates in a third movement area M3, which includes the first observation area "B" and the second observation area "C", vertically or parallel.

Figure 35:
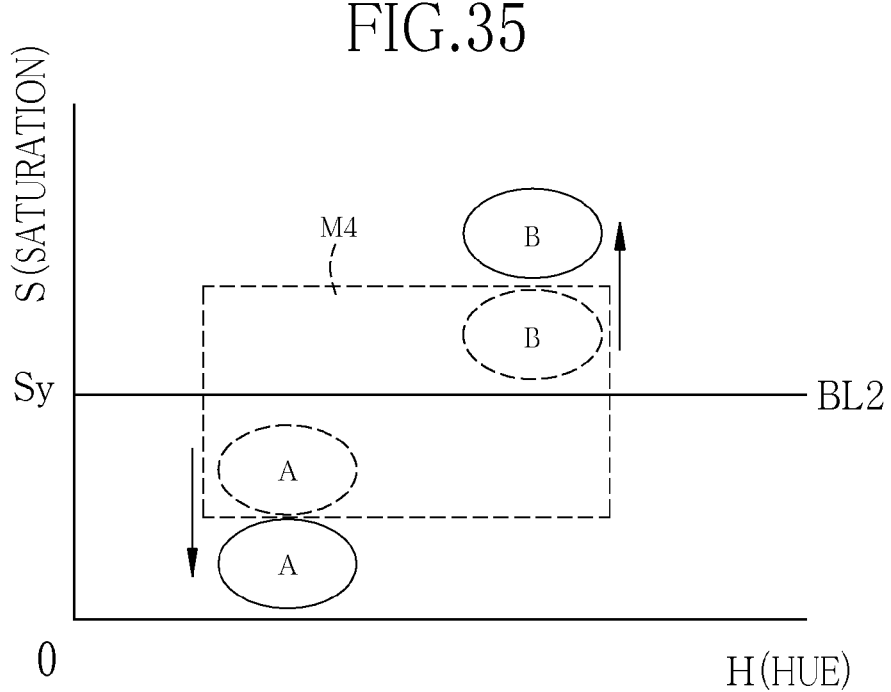
FIG. 35 is an explanatory view illustrating the fourth process in the case where the feature space is the HS space.

As illustrated in FIG. 35, in the fourth process for the HS space, the parallel movement section 90 translates or moves the coordinates in the first observation area "B", which is located on one of the sides of the second boundary BL2, vertically or parallel to themselves to the upward in the saturation direction. The parallel movement section 90 translates or moves the coordinates in the third observation area "A", which is located on the other side of the second boundary BL2, vertically or parallel to themselves to the downward in the saturation direction. Thus, the difference in saturation between the coordinates corresponding to the first observation area "B" and the coordinates corresponding to the third observation area "A" is increased. Incidentally, the second boundary BL2 is provided to a portion, between the first observation area "B" and the third observation area "A" in the HS space, in which the saturation S takes a value Sy (a constant) that is smaller than the value Sx of the first boundary BL1. It is preferred that the parallel movement section 90 translates or moves the coordinates in a fourth movement area M4, which includes the first observation area "B" and the third observation area "A", vertically or parallel. The fourth movement area M4 is greater in size than the third movement area M3.

Second Embodiment

In the second embodiment, a laser and a phosphor are used, instead of the LEDs 20a to 20d of the four colors described in the first embodiment, to illuminate the observation target. Other than that, the configuration is the same as or similar to that in the first embodiment.

Figure 36:
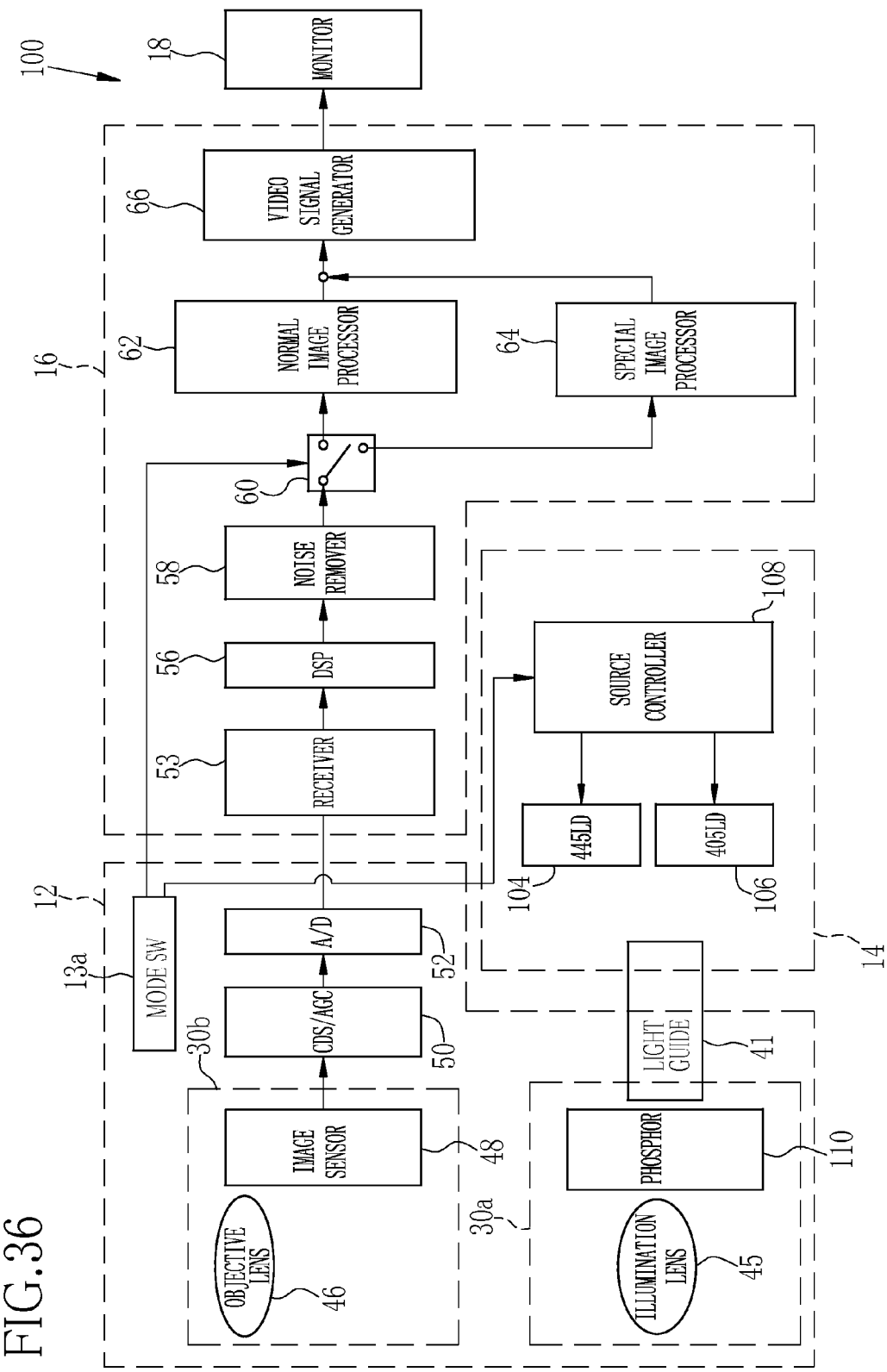
FIG. 36 is a block diagram illustrating functions of an endoscope system according to the second embodiment.

As illustrated in FIG. 36, in the light source device 14 of an endoscope system 100 according to the second embodiment, a blue laser (denoted as "445LD" in FIG. 36) 104 and a blue-violet laser (denoted as "405LD" in FIG. 36) 106 are provided in place of the LEDs 20a to 20d of the four colors. The blue laser 104 emits blue laser beams with the center wavelength of 445±10 nm. The blue-violet laser 106 emits blue-violet laser beams with the center wavelength of 405±10 nm. The light emissions from the semiconductor light emitting elements of the lasers 104 and 106 are controlled individually by a source controller 108. The light quantity ratio between the light (laser beams) from the blue laser 104 and the light (laser beams) from the blue-violet laser 106 is changed as desired.

In the normal observation mode, the source controller 108 actuates the blue laser 104. In the first or second special observation mode, the source controller 108 actuates both the blue laser 104 and the blue-violet laser 106, such that the light-emission ratio of the blue laser beams is greater than that of the blue-violet laser beams. The laser beams emitted from each of the lasers 104 and 106 are incident on the light guide (LG) 41 through optical members (e.g. a condenser lens, an optical fiber, an optical path combiner, and the like, all not shown).

Note that, the full width at half maximum of the blue laser beams or the blue-violet laser beams is preferred to be in the order of ±10 nm. Broad-area type InGaN-based laser diodes may be used for the blue laser 104 and blue-violet laser 106. The InGaNAs-based laser diodes or the GaNAs-based laser diodes may be used instead. A light emitting element such as a light emitting diode may be used as the light source.

The illumination optical system 30a is provided with the illumination lens 45 and a phosphor 110 on which the blue laser beams or the blue-violet laser beams from the light guide 41 are incident. The emission of the blue laser beams causes the phosphor 110 to emit fluorescence. A part of the blue laser beams directly passes through the phosphor 110. The blue-violet laser beams pass through the phosphor 110 without exciting the phosphor 110. The light from the phosphor 110 is applied to the inside of the subject through the illumination lens 45.

Figure 37:
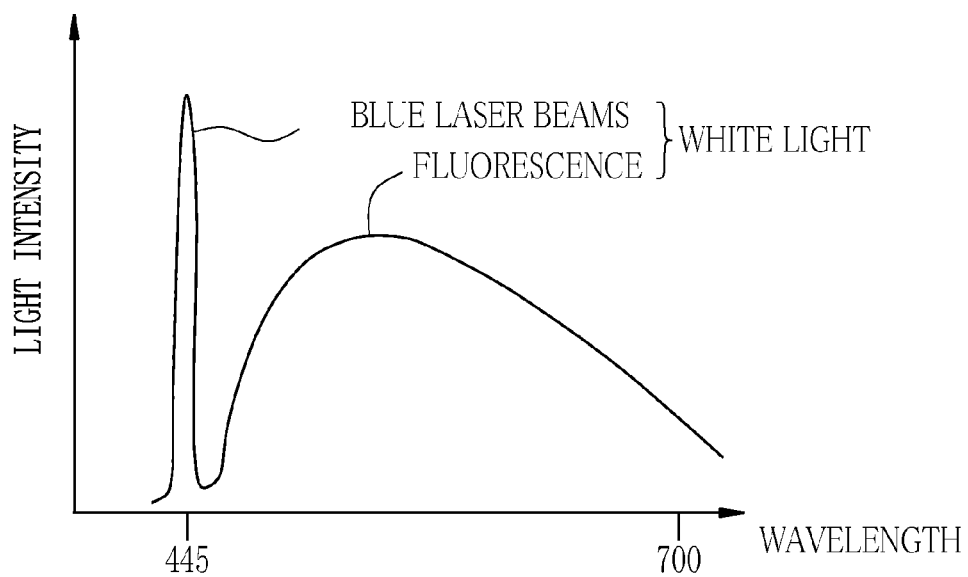
FIG. 37 is a graph illustrating an emission spectrum of white light.
Figure 38:
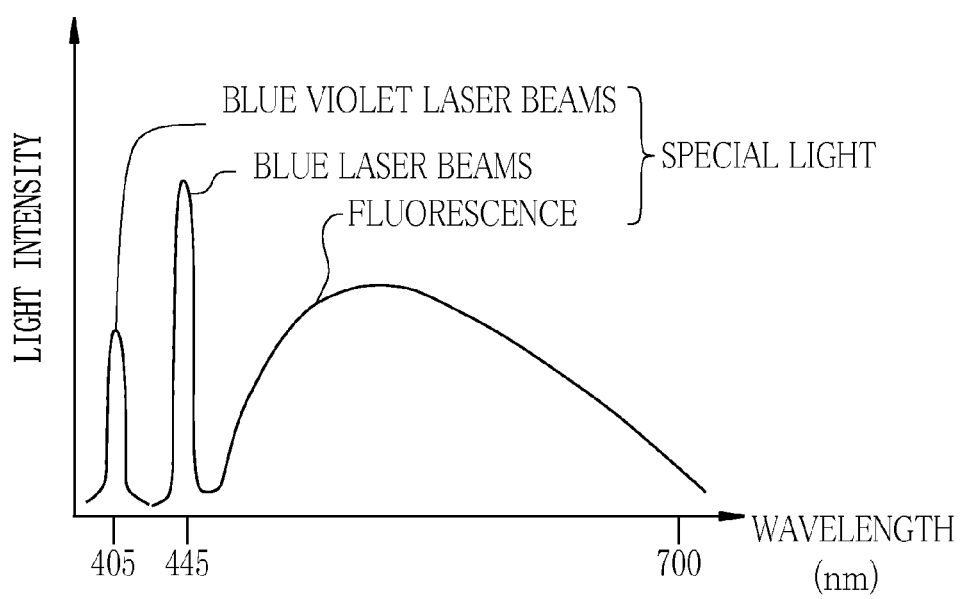
FIG. 38 is a graph illustrating an emission spectrum of special light.

Here, in the normal observation mode, the blue laser beams are mostly incident on the phosphor 110, so that the white light, being the combination of the blue laser beams and the fluorescence from the phosphor 110 excited by the blue laser beams, is applied to the observation target, as illustrated in FIG. 37. In the first or second special observation mode, both the blue-violet laser beams and the blue laser beams are incident on the phosphor 110, so that the special light, being the combination of the blue-violet laser beams, the blue laser beams, and the fluorescence from the phosphor 110 excited by the blue laser beams, is applied to the inside of the subject, as illustrated in FIG. 38.

Note that, it is preferred to use the phosphor 110 containing two or more types of phosphor components (e.g. YAG-based phosphor, BAM ($BaMgAl_{10}O_{17}$), or the like) which absorb a part of the blue laser beams and emit light of green to yellow colors. In the case where the semiconductor light emitting elements are used as the excitation light sources for the phosphor 110 as described in this example, the high-intensity white light is provided with high light-emission efficiency, the intensity of the white light is controlled easily, and the variations in the color temperature and chromaticity of the white light are suppressed to be small.

Third Embodiment

In the third embodiment, instead of the LEDs 20a to 20d of the four colors described in the first embodiment, a broadband light source (e.g. a xenon lamp) and a rotary filter are used to illuminate the observation target. Instead of the color image sensor 48, a monochrome image sensor is used to capture an image of the observation target. The components other than those are the same as or similar to the components described in the first embodiment.

Figure 39:
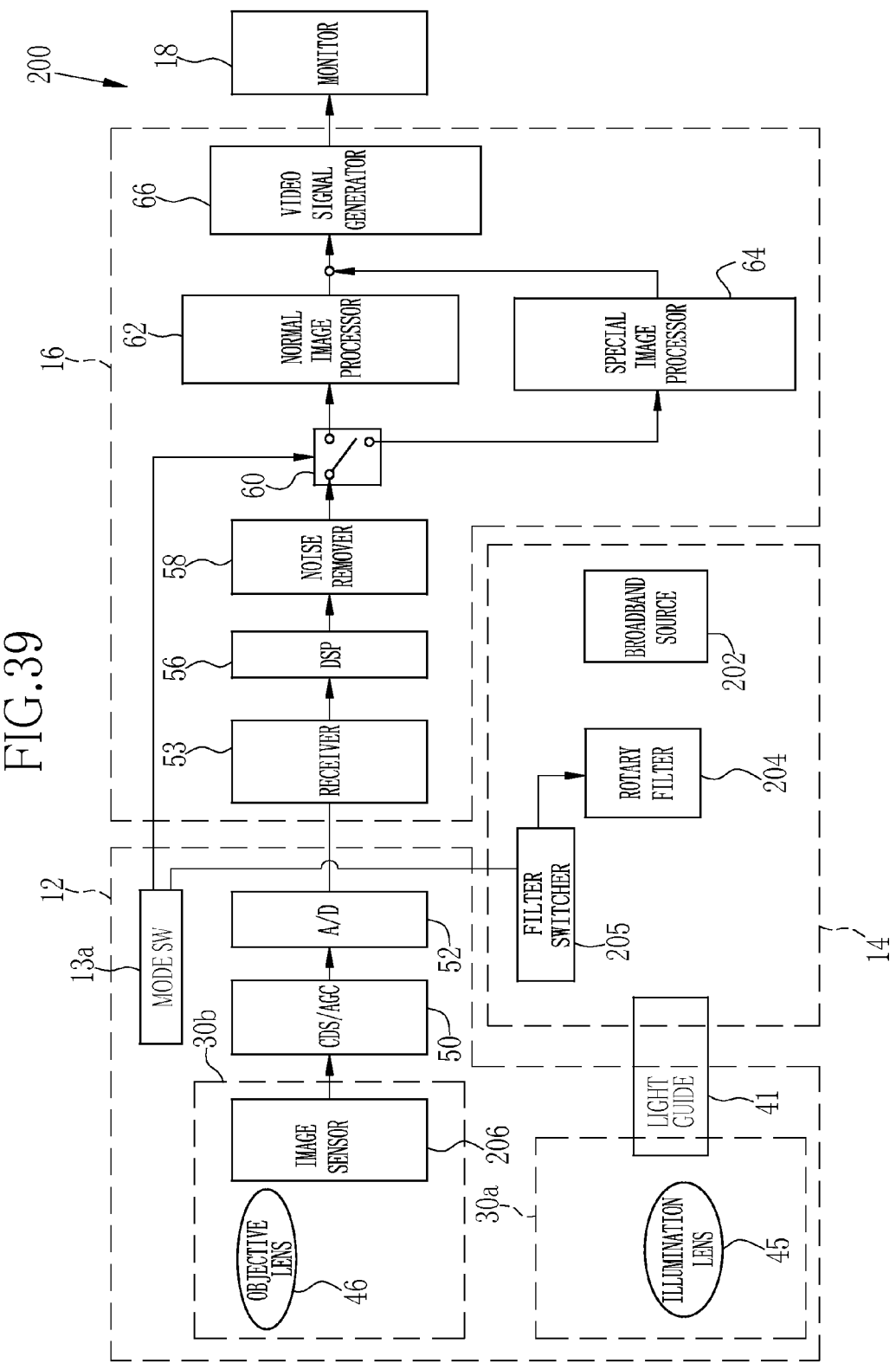
FIG. 39 is a block diagram illustrating functions of an endoscope system according to a third embodiment.

As illustrated in FIG. 39, in an endoscope system 200 of the third embodiment, a broadband light source 202, a rotary filter 204, and a filter switcher 205 are provided instead of the four colors of LEDs 20a to 20d in the light source device 14. The imaging optical system 30b is provided with a monochrome image sensor 206 with no color filter, in place of the color image sensor 48.

The broadband light source 202 is composed of a xenon lamp, a white LED, or the like, and emits the white light having the wavelength range from blue to red. The rotary filter 204 includes a normal observation mode filter 208 provided on the inner side and a special observation mode filter 209 provided on the outer side (see FIG. 40). The normal observation mode filter 208 is used in the normal observation mode. The special observation mode filter 209 is used in the first or second special observation mode. The filter switcher 205 shifts the rotary filter 204 in the radial direction. When the mode is set to the normal observation mode by the operation of the mode SW 13a, the normal observation mode filter 208 of the rotary filter 204 is inserted into the light path of the white light. When the mode is set to the first or second special observation mode, the special observation mode filter 209 of the rotary filter 204 is inserted into the light path of the white light.

Figure 40:
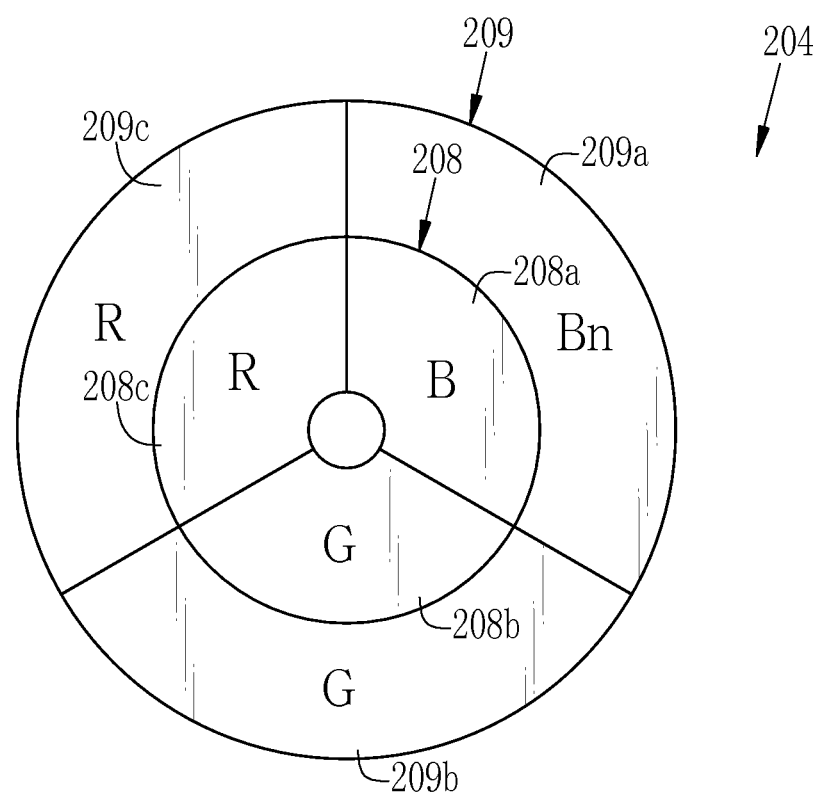
FIG. 40 is a plan view illustrating a rotary filter.

As illustrated in FIG. 40, the normal observation mode filter 208 includes a B filter 208a, a G filter 208b, and an R filter 208c in the circumferential direction. The B filter 208a transmits the blue light of the white light. The G filter 208b transmits the green light of the white light. The R filter 208c transmits the red light of the white light. In the normal observation mode, the blue light, the green light, and the red light are alternately applied in this order to the observation target as the rotary filter 204 is rotated.

The special observation mode filter 209, which is used in the first or second special observation mode, includes a Bn filter 209a, a G filter 209b, and an R filter 209c in the circumferential direction. The Bn filter 209a transmits the blue narrowband light having a specific wavelength range of the white light. The G filter 209b transmits the green light of the white light. The R filter 209c transmits the red light of the white light. In the special observation mode, the blue narrowband light, the green light, and the red light are alternately applied in this order to the observation target as the rotary filter 204 is rotated.

In the endoscope system 200, in the normal observation mode, the monochrome image sensor 206 captures an image of the inside of the subject every time the blue light, the green light, or the red light is applied to the observation target. Thereby, the three colors (RGB) of image signals are obtained. The normal image is produced based on the RGB image signals in a manner the same or similar to that in the first embodiment.

In the first or second special observation mode, the monochrome image sensor 206 captures an image of the inside of the subject every time the blue narrowband light, the green light, or the red light is applied to the observation target. Thereby, the Bn image signal, the G image signal, and the R image signal are obtained. The first or second special image is produced based on the Bn image signal, the G image signal, and the R image signal. The Bn image signal is used in place of the B image signal to produce the first or second special image. Other than that, the first or second special image is produced in a manner the same as or similar to that of the first embodiment.

Fourth Embodiment

In a fourth embodiment, a swallow-type capsule endoscope is used instead of the insertion-type endoscope 12 and the light source device 14, to obtain the RGB image signals necessary for producing the normal image, the first special image, or the second special image.

Figure 41:
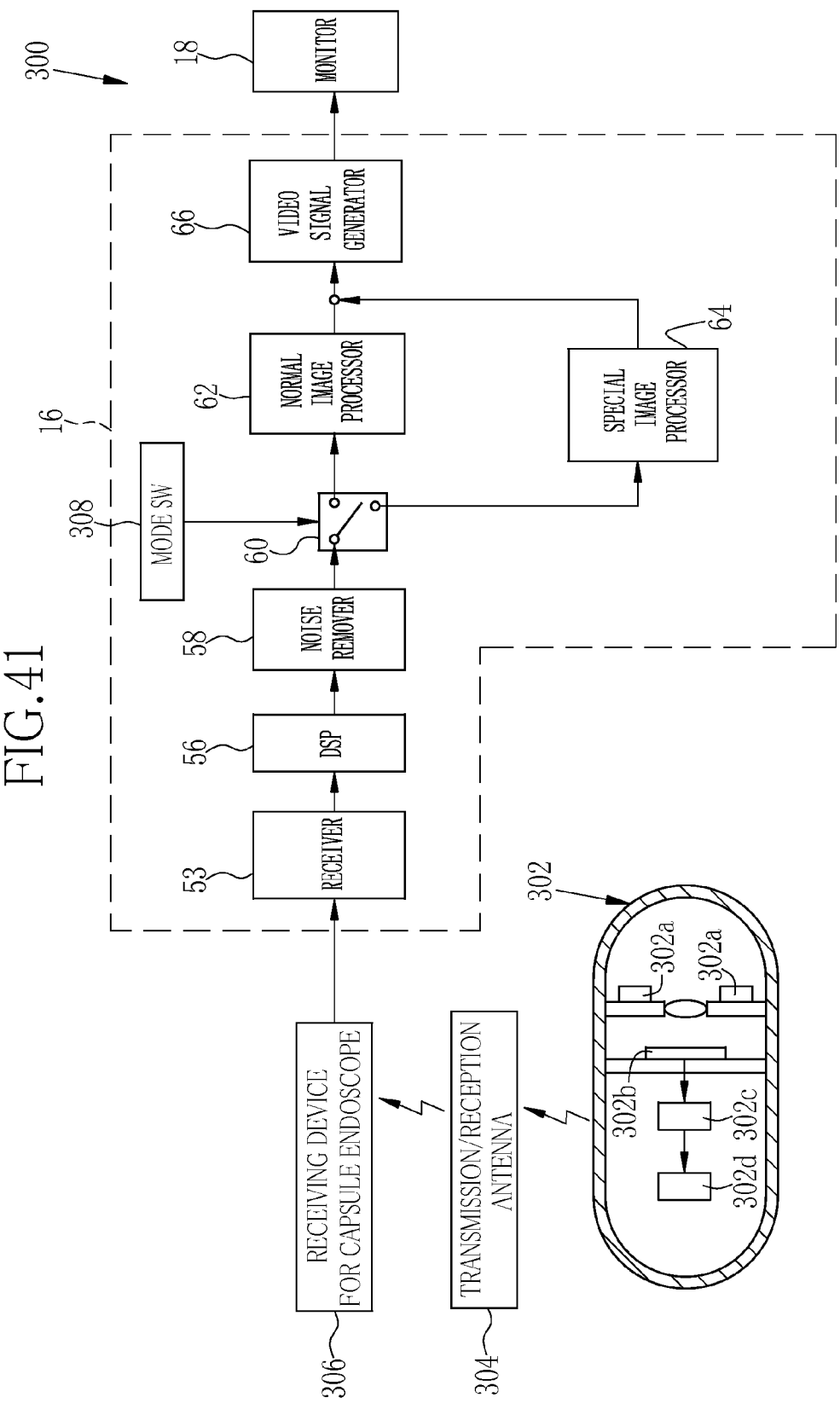
FIG. 41 illustrates functions of a capsule endoscope system according to a fourth embodiment.

As illustrated in FIG. 41, a capsule endoscope system 300 according to the fourth embodiment includes a capsule endoscope 302, a transmission/reception antenna 304, a receiving device 306 for the capsule endoscope 302, the processor device 16, and the monitor 18. The capsule endoscope 302 includes an LED 302a, an image sensor 302b, an image processor 302c, and a transmission antenna 302d. Incidentally, the processor device 16 is the same as or similar to the one used in the first embodiment. In the fourth embodiment, a mode switch (SW) 308 is provided to switch among the normal observation mode, the first special observation mode, and the second special observation mode.

Inside the capsule endoscope 302, two or more LEDs 302a that emit white light are provided. Here, it is preferred that the LED 302a is a white light LED which includes a blue light source and a phosphor which converts wavelengths of light from the blue light source into fluorescence.

An LD (laser diode) may be used instead of the LED. The observation target is illuminated with the white light from the LED 302a.

The image sensor 302b is a color image sensor. The image sensor 302b captures an image of the observation target illuminated with the white light, and outputs the RGB image signals. Here, it is preferred that the image sensor 302b is a CCD (Charge Coupled Device) image sensor or a CMOS (Complementary Metal-Oxide Semiconductor) image sensor. The RGB image signals outputted from the image sensor 302b are subjected, in the image processor 302c, to a process to convert them into signals to be transmitted through the transmission antenna 302d. The RGB image signals, which have passed through the image processor 302c, are transmitted wirelessly from the transmission antenna 302d to the transmission/reception antenna 304.

The transmission/reception antenna 304 is affixed to the subject's body, and receives the RGB image signals from the transmission antenna 302d. The transmission/reception antenna 304 wirelessly transmits the received RGB image signals to the receiving device 306 for the capsule endoscope 302. The receiving device 306 is connected to the receiver 53 of the processor device 16, and transmits the RGB image signals from the transmission/reception antenna 304 to the receiver 53.

Figure 42:
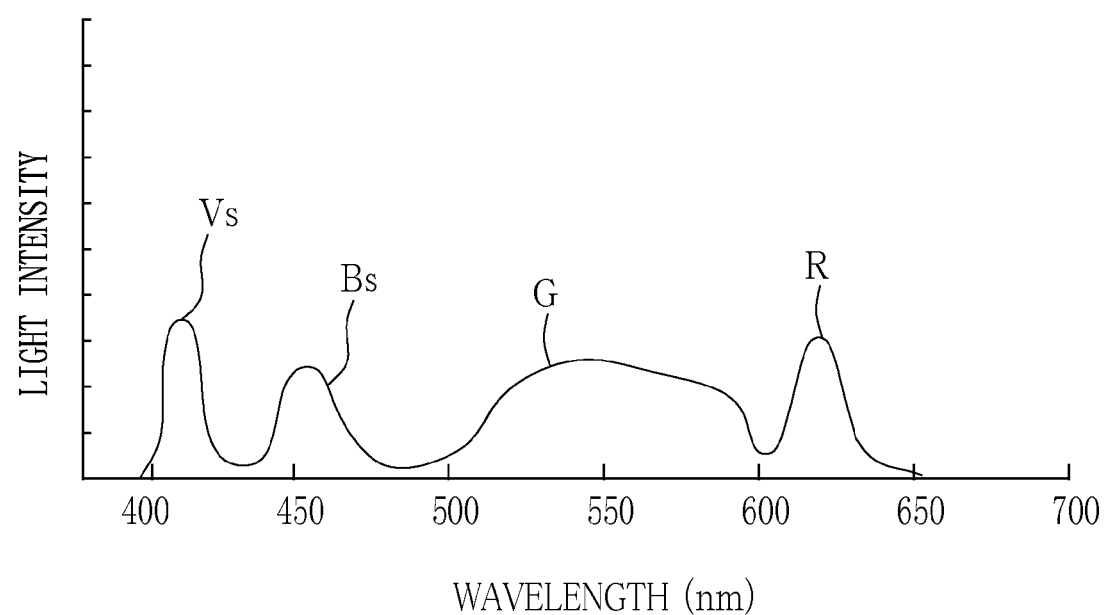
FIG. 42 is a graph illustrating emission spectra of violet light V, blue light B, green light G, and red light R which are different from those of FIG. 3.

Note that, in the above embodiments, the four colors of light with the emission spectra illustrated in FIG. 3 are used by way of example. The emission spectra are not limited to this example. For example, as illustrated in FIG. 42, the green light G and the red light R may have the same spectra as those illustrated in FIG. 3. The violet light Vs may have the center wavelength of 410 to 420 nm in a wavelength range slightly shifted to a longer wavelength side than that of the violet light V in FIG. 3. The blue light Bs may have the center wavelength of 445 to 460 nm in a wavelength range slightly shifted to a shorter wavelength side than that of the blue light B in FIG. 3.

Figure 43:
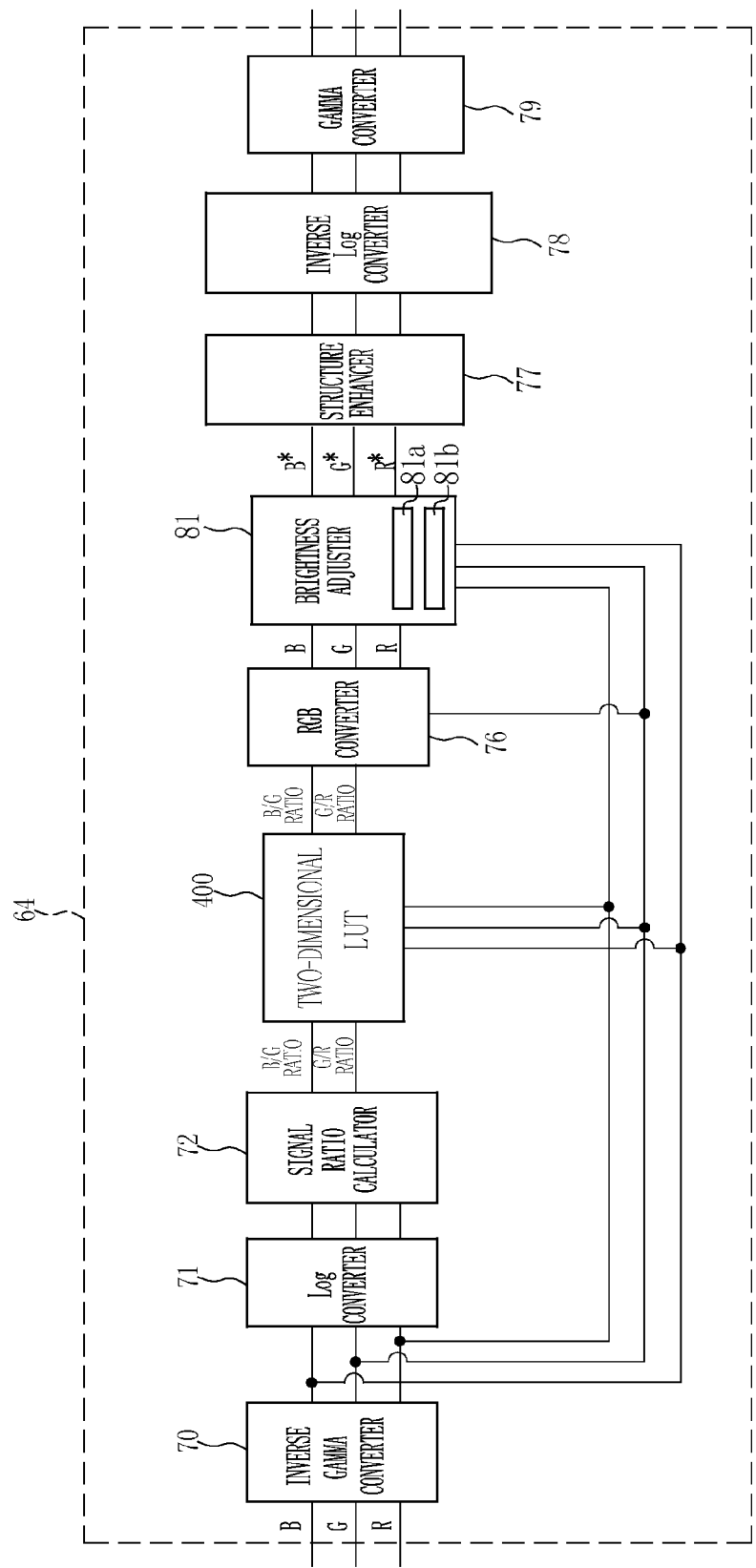
FIG. 43 is a block diagram illustrating functions of the special image processor in the case where a two-dimensional LUT is used.
Figure 44:
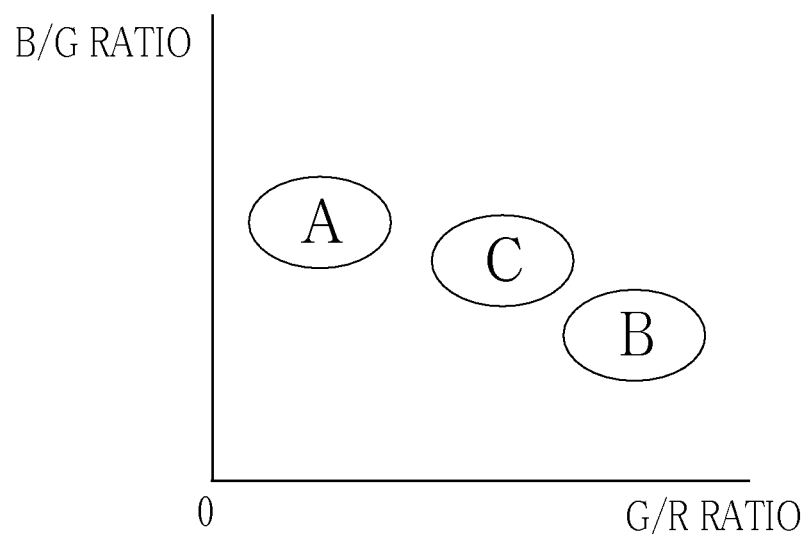
FIG. 44 is an explanatory view illustrating distribution of coordinates corresponding to a portion uninfected with *Helicobacter pylori* (*H. pylori*) (third observation area "A"), distribution of coordinates corresponding to a portion infected with the *H. pylori* (first observation area "B"), and distribution of coordinates corresponding to a portion in which the *H. pylori* infection has been successfully eradicated (second observation area "C"), in the feature space (the vertical axis: B/G ratio, the horizontal axis: G/R ratio).

Note that, in the above embodiments, the B/G ratio and the G/R ratio are converted into the radial coordinate r and the angular coordinate θ through the polar coordinate conversion. Then, the first, second, third, or fourth process is performed based on the radial coordinate r and the angular coordinate θ after the conversion. Thereafter, the radial coordinate r and the angular coordinate θ are converted back into the B/G ratio and the G/R ratio. Alternatively, as illustrated in FIG. 43, a two-dimensional LUT 400 may be used to directly convert the B/G and G/R ratios into the processed B/G and G/R ratios, which have been subjected to the first, second, third, or fourth process, without the polar coordinate conversion.

Note that, the two-dimensional LUT 400 stores the B/G and G/R ratios in association with the processed B/G and G/R ratios which have been subjected to the first, second, third, or fourth process, which are obtained by being subjected to the first, second, third, or fourth process based on the B/G and G/R ratios. The first RGB image signals outputted from the inverse gamma converter 70 are inputted to the two-dimensional LUT 400 and the RGB converter 76.

Note that, in the above embodiments, in order to increase the difference between the first observation area "B" and the second observation area "C", one of the first process for increasing the difference in hue therebetween by expanding or compressing the angle in the feature space and the third process for increasing the difference in saturation therebetween by expanding or compressing the radial coordinate in the feature space is performed. Alternatively, the first process and the third process may be combined to expand or compress both the angle and the radial coordinate in the feature space, such that the difference in both hue and saturation between the first observation area "B" and the second observation area "C" is increased. Additionally, in order to increase the difference between the first observation area "B" and the third observation area "A", one of the second process for increasing the difference in hue therebetween by expanding or compressing the angle in the feature space and the fourth process for increasing the difference in saturation therebetween by expanding or compressing the radial coordinate in the feature space is performed. Alternatively, the second process and the fourth process may be combined to expand or compress both the angle and the radial coordinate in the feature space, such that the difference in both hue and saturation between the first observation area "B" and the third observation area "A" is increased.

Note that, the present invention is applicable to various types of medical image processing devices in addition to the endoscope systems described in the first to third embodiments and the processor device incorporated in the capsule endoscope system described in the fourth embodiment.

Various changes and modifications are possible in the present invention and may be understood to be within the present invention.

What is claimed is:

1. A medical image processing device comprising:
an input processing unit for performing an input process of a first color image signal;
a color information obtaining section for obtaining two or more pieces of color information from the first color image signal; and
a saturation enhancement processing unit for performing a saturation enhancement process EPx for increasing a difference in saturation between coordinates in a first observation area and coordinates in a second observation area in a feature space formed by the two or more pieces of color information, the first observation area being located on one side of a first boundary, and the second observation area being located on the other side of the first boundary.

2. The medical image processing device according to claim 1, wherein the saturation enhancement process EPx changes radial coordinates represented by coordinates in the first observation area and radial coordinates represented by coordinates in the second observation area such that the radial coordinates in the first observation area and the radial coordinates in the second observation areas are moved away from the first boundary.

3. The medical image processing device according to claim 2, wherein a radial coordinate changing region including the coordinates in the first observation area and the coordinates in the second observation area is composed of a radial coordinate changing region Rx extending from the first boundary to a specific extent and a radial coordinate changing region Ry beyond the radial coordinate changing region Rx, and a radial coordinate change rate Wy in the radial coordinate changing region Ry is less than a radial coordinate change rate Wx in the radial coordinate changing region Rx.

4. The medical image processing device according to claim 3, wherein the saturation enhancement process EPx includes a radial coordinate expansion process for changing the radial coordinates in the radial coordinate changing region Rx at the radial coordinate change rate Wx of greater than "1", and a radial coordinate compression process for changing the radial coordinates in the radial coordinate changing region Ry at the radial coordinate change rate Wy of less than "1".

5. The medical image processing device according to claim 1, wherein the saturation enhancement processing unit performs a saturation enhancement process EPy for increasing a difference in saturation between coordinates in the first observation area and coordinates in a third observation area in the feature space, in which the first observation area is located on one side of a second boundary and the third observation area is located on the other side of the second boundary, and the second boundary differs from the first boundary.

6. The medical image processing device according to claim 1, wherein the first color image signal is composed of image signals of three colors, and the two or more pieces of color information is composed of a first signal ratio between the image signals of the two colors of out of the image signals of the three colors and a second signal ratio between the image signals of the two colors out of the image signals of the three colors, and one of the colors of the image signals of the second signal ratio differs from the colors of the image signals of the first signal ratio, and the feature space is a signal ratio space formed by the first and second signal ratios.

7. The medical image processing device according to claim 6, wherein the first signal ratio correlates with a blood vessel depth and the second signal ratio correlates with a blood volume.

8. The medical image processing device according to claim 7, wherein the first signal ratio is a B/G ratio and the second signal ratio is a G/R ratio.

9. The medical image processing device according to claim 1, wherein the feature space is any one of Cb-Cr space formed by chrominance signals Cr and Cb, being the two or more pieces of color information, and ab space formed by color components a* and b*, being the two or more pieces of color information, in a CIE Lab space.

10. The medical image processing device according to claim 1, wherein the two or more pieces of color information are hue H and saturation S, and the feature space is an HS space formed by the hue H and the saturation S.

11. The medical image processing device according to claim 10, wherein the coordinates in the first observation area and the coordinates in the second observation area are moved in a saturation direction in the HS space by the saturation enhancement process EPx such that the coordinates in the first observation area and the coordinates in the second observation area are moved away from the first boundary.

12. The medical image processing device according to claim 10, wherein the saturation enhancement processing unit performs a saturation enhancement process EPy for increasing a difference in saturation between coordinates in the first observation area and coordinates in a third observation area in the HS space, in which the first observation area is located on one side of a second boundary and the third observation area is located on the other side of the second boundary, and the second boundary differs from the first boundary.

13. The medical image processing device according to claim 1, further comprising:
a color image signal converter for converting the two or more pieces of color information, which have been subjected to the saturation enhancement process EPx in the saturation enhancement processing unit, into a second color image signal; and a brightness adjuster for adjusting a pixel value of the second color image signal based on first brightness information obtained from the first color image signal and second brightness information obtained from the second color image signal.

14. A method for operating a medical image processing device comprising the steps of:
performing an input process of a first color image signal with an input processing unit;
obtaining two or more pieces of color information from the first color image signal with a color information obtaining section; and
performing a saturation enhancement process EPx, with a saturation enhancement processing unit, for increasing a difference in saturation between coordinates in a first observation area and coordinates in a second observation area in a feature space, the feature space being formed by the two or more pieces of color information, the first observation area being located on one side of a first boundary, and the second observation area being located on the other side of the first boundary.

* * * * *